(12) United States Patent
Cyphers

(10) Patent No.: US 11,240,451 B2
(45) Date of Patent: Feb. 1, 2022

(54) ELECTRONIC IMAGING ENHANCEMENT SYSTEM

(71) Applicant: Craig T. Cyphers, Honey Brook, PA (US)

(72) Inventor: Craig T. Cyphers, Honey Brook, PA (US)

(*) Notice: Subject to any disclaimer, the term of this patent is extended or adjusted under 35 U.S.C. 154(b) by 135 days.

(21) Appl. No.: 16/794,028

(22) Filed: Feb. 18, 2020

(65) Prior Publication Data

US 2020/0267343 A1    Aug. 20, 2020

Related U.S. Application Data

(60) Provisional application No. 62/807,203, filed on Feb. 18, 2019.

(51) Int. Cl.
*H04N 5/372* (2011.01)
*H04N 9/04* (2006.01)
*G01J 1/04* (2006.01)

(52) U.S. Cl.
CPC ........ *H04N 5/37213* (2013.01); *G01J 1/0407* (2013.01); *H04N 9/0455* (2018.08)

(58) Field of Classification Search
CPC .. H04N 5/37213; H04N 9/0455; H04N 5/372; H04N 9/04551; G01J 1/0407
See application file for complete search history.

(56) References Cited

U.S. PATENT DOCUMENTS 8,035,068 B2* 10/2011 Ishigaki ............. H04N 9/04557
250/208.1
2007/0145273 A1* 6/2007 Chang ................ H04N 9/04555
250/338.1

* cited by examiner

*Primary Examiner* — Seung C Sohn
(74) *Attorney, Agent, or Firm* — Donn K. Harms

(57) ABSTRACT

An electronic imaging system for a digital camera or imaging device includes a secondary filter having a plurality of filter openings. Each of the filter openings configured to align with a respective light sensor positioned in a grid of light sensors on a CCD. Light filtering media located in the filter openings is employed to reduce light transmitted to the light sensors to either prevent overloads of the sensors or to calculate a corrected light sensor output from a light sensor positioned adjacent an overloaded light sensor.

18 Claims, 47 Drawing Sheets

FIG. 1C

| A | B | A | B | A | B |
|---|---|---|---|---|---|
| C | D | C | D | C | D |
| A | B | A | B | A | B |
| C | D | C | D | C | D |

FIG. 1D

| A | B | A | B |
|---|---|---|---|
| C | D | C | D |
| A | B | A | B |

| A | B | A | B |
|---|---|---|---|
| C | AB / CD | BA / DC | AB / CD | D |
|  | CD / AB | DC / BA | CD / AB |  |
| A | B | A | B |

FIG. 1E

| 1 | T | RL |
|---|---|---|
|   | BL | D1 |

| 2 | T | R1 |
|---|---|---|
|   | B1 | D3 |

| 3 | D2 | R1 |
|---|---|---|
|   | B1 | T |

| 4 | R1 | GL |
|---|---|---|
|   | G3 | B1 |

| 5 | T | D2 |
|---|---|---|
|   | D6 | D4 |

| 6 | T | R |
|---|---|---|
|   | B | D2 |

| | | |
|---|---|---|
| T | Transparent | |
| DN | Neutral Density (Dark) | |
| RL | Red Light | |
| R | Red | |
| RN | Red Blocked | |
| GL | Green Light | |
| G | Green | |
| GL | Green Blocked | |
| BL | Blue Light | |
| B | Blue | |
| BN | Blue Blocked | |
| YL | Yellow Light | |
| Y | Yellow | |
| YN | Yellow Blocked | |
| CL | Cyan Light | |
| C | Cyan | |
| CN | Cyan Blocked | |
| ML | Magenta Light | |
| M | Magenta | |
| MN | Magenta Blocked | |

| | Opt. 1 | Opt. 2 | Opt. 3 | Opt. 4 | Opt. 5 | Opt. 6 |
|---|---|---|---|---|---|---|
| A | T | T | D2 | R1 | T | T |
| B | RL | R1 | R1 | GL | D2 | R |
| C | BL | B1 | B1 | G3 | D6 | B |
| D | D1 | D3 | T | B1 | D4 | D1 |

FIG. 2A

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

FIG. 2B

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

FIG. 2C

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

FIG. 2D

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

FIG. 2E

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

FIG. 2F

| D | A | E | B | C | D | A |
|---|---|---|---|---|---|---|
| B | C | D | A | E | B | C |
| A | E | B | C | D | A | E |
| C | D | A | E | B | C | D |
| E | B | C | D | A | E | B |

|   | Opt. 1 | Opt. 2 | Opt. 3 | Opt. 4 |
|---|--------|--------|--------|--------|
| A | T      | D2     | D3     | T      |
| B | D2     | R      | R1     | R      |
| C | G      | T      | T      | G      |
| D | R      | B      | B1     | Y      |
| E | B      | D4     | D5     | D2     |

| T  | R  | G2 |
|----|----|----|
| B2 | D2 | B  |
| G  | R2 | D4 |

FIG. 3H

| T  | R  | BL |
|----|----|----|
| RL | B  | D3 |
| R2 | G  | B2 |

FIG. 3J

| RL | GL | D6 |
|----|----|----|
| B2 | T  | R2 |
| D3 | G2 | BL |

FIG. 3K

| ML | D6 | GL |
|----|----|----|
| B2 | T  | Y2 |
| D3 | G2 | BL |

FIG. 3L

| R2 | BL | D3 |
|----|----|----|
| GL | T  | Y2 |
| D3 | B2 | G2 |

FIG. 3M

| D1 | D5 | B  |
|----|----|----|
| D3 | T  | D2 |
| R  | D6 | D4 |

FIG. 3N

|   | Opt. 3G | Opt. 3H | Opt. 3J | Opt. 3K | Opt. 3L | Opt. 3M |
|---|---------|---------|---------|---------|---------|---------|
| A | T       | T       | RL      | ML      | R2      | D1      |
| B | D2      | R       | GL      | D6      | BL      | D5      |
| C | D4      | BL      | D6      | GL      | D3      | B       |
| D | D6      | RL      | B2      | B2      | GL      | D3      |
| E | BL      | B       | T       | T       | T       | T       |
| F | GL      | D3      | R2      | Y2      | Y2      | D2      |
| G | B2      | R2      | D3      | D3      | D5      | R       |
| H | G2      | G       | G2      | G2      | B2      | D6      |
| J | R2      | B2      | BL      | BL      | G2      | D4      |

| L | M | A | E | F | G | H | J | N | B |
|---|---|---|---|---|---|---|---|---|---|
| N | B | C | D | K | L | M | A | E | F |
| E | F | G | H | J | N | B | C | D | K |
| D | K | L | M | A | E | F | G | H | J |
| H | J | N | B | C | D | K | L | M | A |
| M | A | E | F | G | H | J | N | B | C |
| B | C | D | K | L | M | A | E | F | G |
| F | G | H | J | N | B | C | D | K | L |
| K | L | M | A | E | F | G | H | J | N |
| J | N | B | C | D | K | L | M | A | E |

Fig 4F

| L | M | A | E | F | G | H | J | N | B |
|---|---|---|---|---|---|---|---|---|---|
| N | B | C | D | K | L | M | A | E | F |
| E | F | G | H | J | N | B | C | D | K |
| D | K | L | M | A | E | F | G | H | J |
| H | J | N | B | C | D | K | L | M | A |
| M | A | E | F | G | H | J | N | B | C |
| B | C | D | K | L | M | A | E | F | G |
| F | G | H | J | N | B | C | D | K | L |
| K | L | M | A | E | F | G | H | J | N |
| J | N | B | C | D | K | L | M | A | E |

FIG. 4G

|    |    | RL |    |    |
|----|----|----|----|----|
|    | D4 | B4 | G2 |    |
| GL | B2 | T  | R2 | BL |
|    | D6 | R4 | D2 |    |
|    |    | G4 |    |    |

FIG. 4H

|    |    | G  |    |    |
|----|----|----|----|----|
|    | T  | RL | D3 |    |
| R2 | G2 | B  | Y  | GL |
|    | D1 | R  | D2 |    |
|    |    | B  |    |    |

FIG. 4J

|    |    | RL |    |    |
|----|----|----|----|----|
|    | D4 | B2 | D2 |    |
| BL | R2 | T  | GL | Y2 |
|    | D6 | YL | D3 |    |
|    |    | G2 |    |    |

FIG. 4K

|   | Opt. 1 | Opt. 2 | Opt. 3 |
|---|--------|--------|--------|
| A | RL | G  | RL |
| B | D4 | T  | D4 |
| C | B4 | RL | B2 |
| D | G2 | D3 | D2 |
| E | GL | R2 | BL |
| F | B2 | G2 | R2 |
| G | T  | B  | T  |
| H | R2 | Y  | GL |
| J | BL | GL | Y2 |
| K | D6 | D1 | D6 |
| L | R4 | R  | YL |
| M | D2 | D2 | D3 |
| N | G4 | B  | G2 |

Fig 5A

| O | P | Q | A | R | S | T | U | V | B | C | D | W | X |
|---|---|---|---|---|---|---|---|---|---|---|---|---|---|
| U | V | B | C | D | W | X | Y | E | F | G | H | J | Z |
| Y | E | F | G | H | J | Z | K | L | M | N | O | P | Q |
| K | L | M | N | O | P | Q | A | R | S | T | U | V | B |
| A | R | S | T | U | V | B | C | D | W | X | Y | E | F |
| C | D | W | X | Y | E | F | G | H | J | Z | K | L | M |
| G | H | J | Z | K | L | M | N | O | P | Q | A | R | S |
| N | O | P | Q | A | R | S | T | U | V | B | C | D | W |
| T | U | V | B | C | D | W | X | Y | E | F | G | H | J |
| X | Y | E | F | G | H | J | Z | K | L | M | N | O | P |
| Z | K | L | M | N | O | P | Q | A | R | S | T | U | V |
| Q | A | R | S | T | U | V | B | C | D | W | X | Y | E |
| B | C | D | W | X | Y | E | F | G | H | J | Z | K | L |
| F | G | H | J | Z | K | L | M | N | O | P | Q | A | R |

Fig 5B

| O | P | Q | A | R | S | T | U | V | B |
|---|---|---|---|---|---|---|---|---|---|
| U | V | B | C | D | W | X | Y | E | F |
| Y | E | F | G | H | J | Z | K | L | M |
| K | L | M | N | O | P | Q | A | R | S |
| A | R | S | T | U | V | B | C | D | W |
| C | D | W | X | Y | E | F | G | H | J |
| G | H | J | Z | K | L | M | N | O | P |
| N | O | P | Q | A | R | S | T | U | V |
| T | U | V | B | C | D | W | X | Y | E |
| X | Y | E | F | G | H | J | Z | K | L |

Fig 5D

| O | P | Q | A | R | S | T | U | V | B |
|---|---|---|---|---|---|---|---|---|---|
| U | V | B | C | D | W | X | Y | E | F |
| Y | E | F | G | H | J | Z | K | L | M |
| K | L | M | N | O | P | Q | A | R | S |
| A | R | S | T | U | V | B | C | D | W |
| C | D | W | X | Y | E | F | G | H | J |
| G | H | J | Z | K | L | M | N | O | P |
| N | O | P | Q | A | R | S | T | U | V |
| T | U | V | B | C | D | W | X | Y | E |
| X | Y | E | F | G | H | J | Z | K | L |

Fig 5C

| O | P | Q | A | R | S | T | U | V | B |
|---|---|---|---|---|---|---|---|---|---|
| U | V | B | C | D | W | X | Y | E | F |
| Y | E | F | G | H | J | Z | K | L | M |
| K | L | M | N | O | P | Q | A | R | S |
| A | R | S | T | U | V | B | C | D | W |
| C | D | W | X | Y | E | F | G | H | J |
| G | H | J | Z | K | L | M | N | O | P |
| N | O | P | Q | A | R | S | T | U | V |
| T | U | V | B | C | D | W | X | Y | E |
| X | Y | E | F | G | H | J | Z | K | L |

Fig 5E

| O | P | Q | A | R | S | T | U | V | B |
|---|---|---|---|---|---|---|---|---|---|
| U | V | B | C | D | W | X | Y | E | F |
| Y | E | F | G | H | J | Z | K | L | M |
| K | L | M | N | O | P | Q | A | R | S |
| A | R | S | T | U | V | B | C | D | W |
| C | D | W | X | Y | E | F | G | H | J |
| G | H | J | Z | K | L | M | N | O | P |
| N | O | P | Q | A | R | S | T | U | V |
| T | U | V | B | C | D | W | X | Y | E |
| X | Y | E | F | G | H | J | Z | K | L |

FIG. 5H

| | Opt. 1 | Opt. 2 |
|---|---|---|
| A | G2 | G4 |
| B | BL | BL |
| C | D6 | D6 |
| D | G4 | Y2 |
| E | R | R |
| F | CL | CL |
| G | R2 | M |
| H | D3 | D3 |
| J | G | G |
| K | G3 | YL |
| L | R4 | M2 |
| M | GL | GL |
| N | T | T |
| O | RL | RL |
| P | B2 | B4 |
| Q | D4 | C2 |
| R | B4 | D1 |
| S | D1 | D4 |
| T | D8 | C |
| U | D2 | D2 |
| V | G3 | Y |
| W | R2 | R4 |
| X | B | B |
| Y | R3 | ML |
| Z | D5 | D5 |

Fig. 6A

| A | B | C | D | A | B | C | D |
| E | F | G | H | E | F | G | H |
| J | K | L | M | J | K | L | M |
| N | P | Q | R | N | P | Q | R |
| A | B | C | D | A | B | C | D |
| E | F | G | H | E | F | G | H |
| J | K | L | M | J | K | L | M |
| N | P | Q | R | N | P | Q | R |

FIG. 6B

| A | B | C | D | A | B |
|---|---|---|---|---|---|
| E | F | G | H | E | F |
| J | K | ABCD EFGH JKLM NPQR | BCDA FGHE KLMJ PQRN | M | J | K |
| N | EFGH JKLM NPQR ABCD | PQRE KLMJ PQRN BCDA | N | P |
| | P | Q | R | | |
| A | B | C | D | A | B |
| E | F | G | H | E | F |

Fig. 6C

| RL | G2 | B4 | D6 |
|----|----|----|----|
| B2 | D4 | R6 | GL |
| D2 | BL | G6 | R4 |
| G4 | R2 | T  | B6 |

Fig. 6E

| RL | B5 | D4 | G1 |
|----|----|----|----|
| D2 | G3 | R5 | BL |
| B3 | R1 | GL | D6 |
| G5 | T  | B1 | R3 |

Fig. 6D

| R  | B2 | G4 | D6 |
|----|----|----|----|
| G6 | T  | R2 | B  |
| B4 | R6 | D4 | G2 |
| D2 | G  | B6 | R4 |

Fig. 6F

| RL | G3 | B  | D2 |
|----|----|----|----|
| B1 | R5 | T  | B5 |
| G  | D1 | B3 | G1 |
| D4 | BL | R  | D6 |

FIG. 6G

|   | Option 6C | Option 6D | Option 6E | Option 6F |
|---|---|---|---|---|
| A | RL | R | RL | RL |
| B | G2 | B2 | B5 | G3 |
| C | B4 | G4 | D4 | B |
| D | D6 | D6 | G1 | D2 |
| E | B2 | G6 | D2 | B1 |
| F | D4 | T | G3 | R5 |
| G | R6 | R2 | R5 | T |
| H | GL | B | BL | B5 |
| J | D2 | B4 | B3 | G |
| K | BL | R6 | R1 | D1 |
| L | G6 | D4 | GL | B3 |
| M | R4 | G2 | D6 | G1 |
| N | G4 | D2 | G5 | D4 |
| P | R2 | G | T | BL |
| Q | T | B6 | B1 | R |
| R | B6 | R4 | R3 | D6 |

FIG. 7A

| M | A | B | L | M | A | B | L | M | A |
|---|---|---|---|---|---|---|---|---|---|
| C | D | E | F | C | D | E | F | C | D |
| G | H | J | K | G | H | J | K | G | H |
| B | L | M | A | B | L | M | A | B | L |
| E | F | C | D | E | F | C | D | E | F |
| J | K | G | H | J | K | G | H | J | K |
| M | A | B | L | M | A | B | L | M | A |
| C | D | E | F | C | D | E | F | C | D |
| G | H | J | K | G | H | J | K | G | H |
| B | L | M | A | B | L | M | A | B | L |

FIG. 7B

| M | A | B | L | M |
|---|---|---|---|---|
| C | D | E | F | C |
| G | H | ABCDEF GHJKLM | BLDEFC HJKGMA | K | G |
| | | DEGHJK BLMAFC | EFHJKG LMABCD | | |
| B | L | M | A | B |
| E | F | C | D | E |

FIG. 7C

|    |    |    |    |
|----|----|----|----|
|    | R  | D6 |    |
| B3 | T  | B5 | G5 |
| R5 | G3 | R3 | D2 |
|    | D4 | B  |    |

FIG. 7D

|    |    |    |    |
|----|----|----|----|
|    | D5 | R3 |    |
| G  | R5 | B  | T  |
| B3 | D3 | D7 | B5 |
|    | R  | G3 |    |

FIG. 7E

|   | Opt. 7C | Opt. 7D |
|---|---------|---------|
| A | R       | D5      |
| B | D6      | R3      |
| C | B3      | G       |
| D | T       | R5      |
| E | B5      | B       |
| F | G5      | T       |
| G | R5      | B3      |
| H | G3      | D3      |
| J | R3      | D7      |
| K | D2      | B5      |
| L | D4      | R       |
| M | B       | G3      |

FIG. 8A

| U | V | A | B | C | T | U | V | A | B | C | T | U |
|---|---|---|---|---|---|---|---|---|---|---|---|---|
| W | D | E | F | G | H | W | D | E | F | G | H | W |
| X | J | K | L | M | N | X | J | K | L | M | N | X |
| Y | O | P | Q | R | S | Y | O | P | Q | R | S | Y |
| B | C | T | U | V | A | B | C | T | U | V | A | B |
| F | G | H | W | D | E | F | G | H | W | D | E | F |
| L | M | N | X | J | K | L | M | N | X | J | K | L |
| Q | R | S | Y | O | P | Q | R | S | Y | O | P | Q |
| U | V | A | B | C | T | U | V | A | B | C | T | U |
| W | D | E | F | G | H | W | D | E | F | G | H | W |
| X | J | K | L | M | N | X | J | K | L | M | N | X |
| Y | O | P | Q | R | S | Y | O | P | Q | R | S | Y |
| B | C | T | U | V | A | B | C | T | U | V | A | B |

|    | R  | D4 | C  |    |
|----|----|----|----|----|
| B4 | G4 | D6 | B2 | D2 |
| Y  | R6 | T  | D5 | G  |
| D1 | B  | D3 | M  | R4 |
|    | G6 | R2 | B6 |    |

FIG. 8G

| | Option 8F |
|---|---|
| V | R |
| A | D4 |
| B | C |
| W | B4 |
| D | G4 |
| E | D6 |
| F | B2 |
| G | D2 |
| X | Y |
| J | R6 |
| K | T |
| L | D5 |
| M | G |
| Y | D1 |
| O | B |
| P | D3 |
| Q | M |
| R | R4M |
| C | G6 |
| T | R2 |
| U | B6 |
| H | Y3 |
| N | C3 |
| S | M3 |

FIG. 9A

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

FIG. 9B

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

FIG. 9C

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

FIG. 9D

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

FIG. 9E

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

FIG. 9F

| C | A | B | C | A | B | C |
|---|---|---|---|---|---|---|
| B | C | A | B | C | A | B |
| A | B | C | A | B | C | A |
| C | A | B | C | A | B | C |
| B | C | A | B | C | A | B |

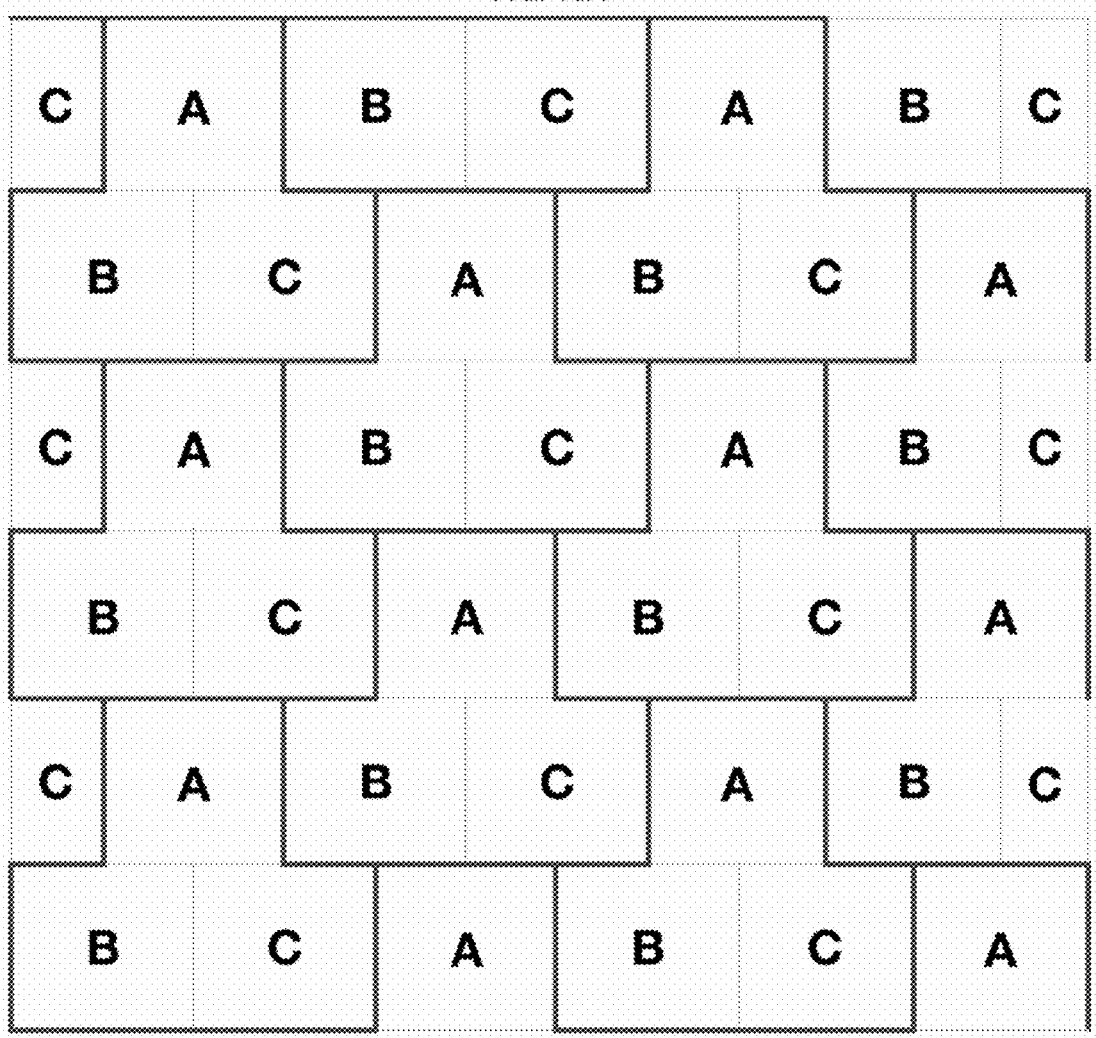

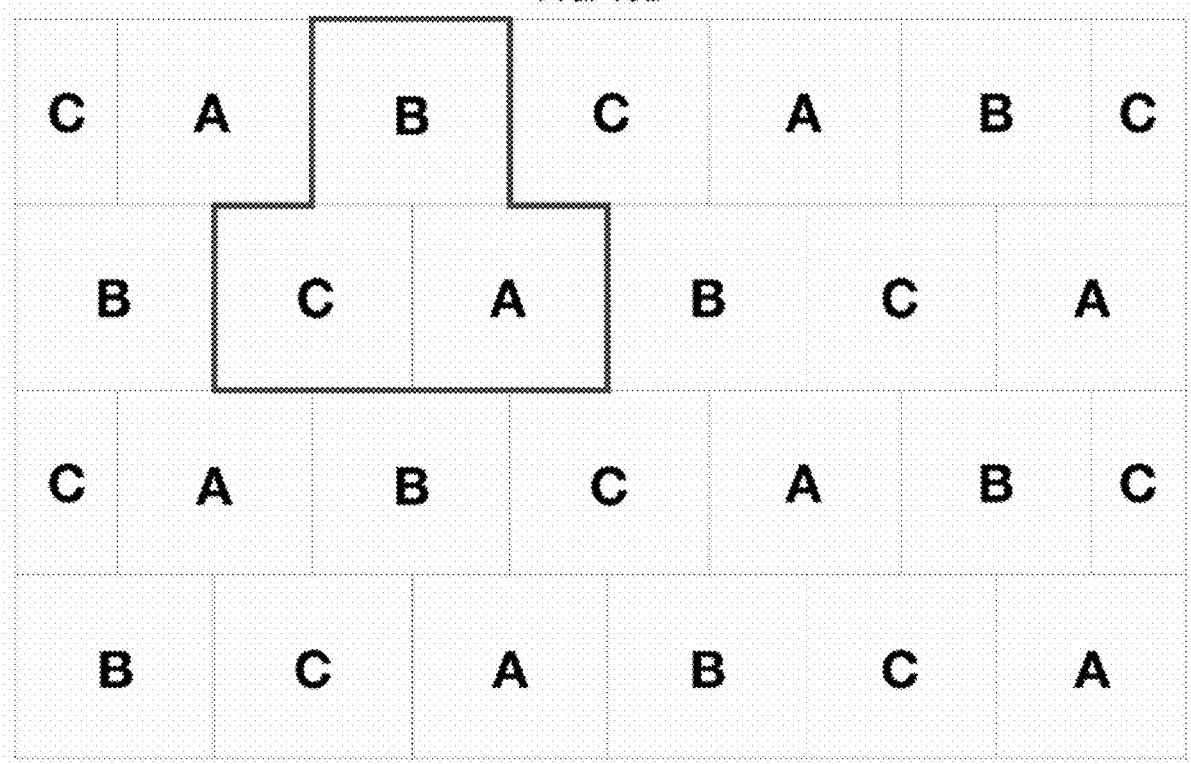
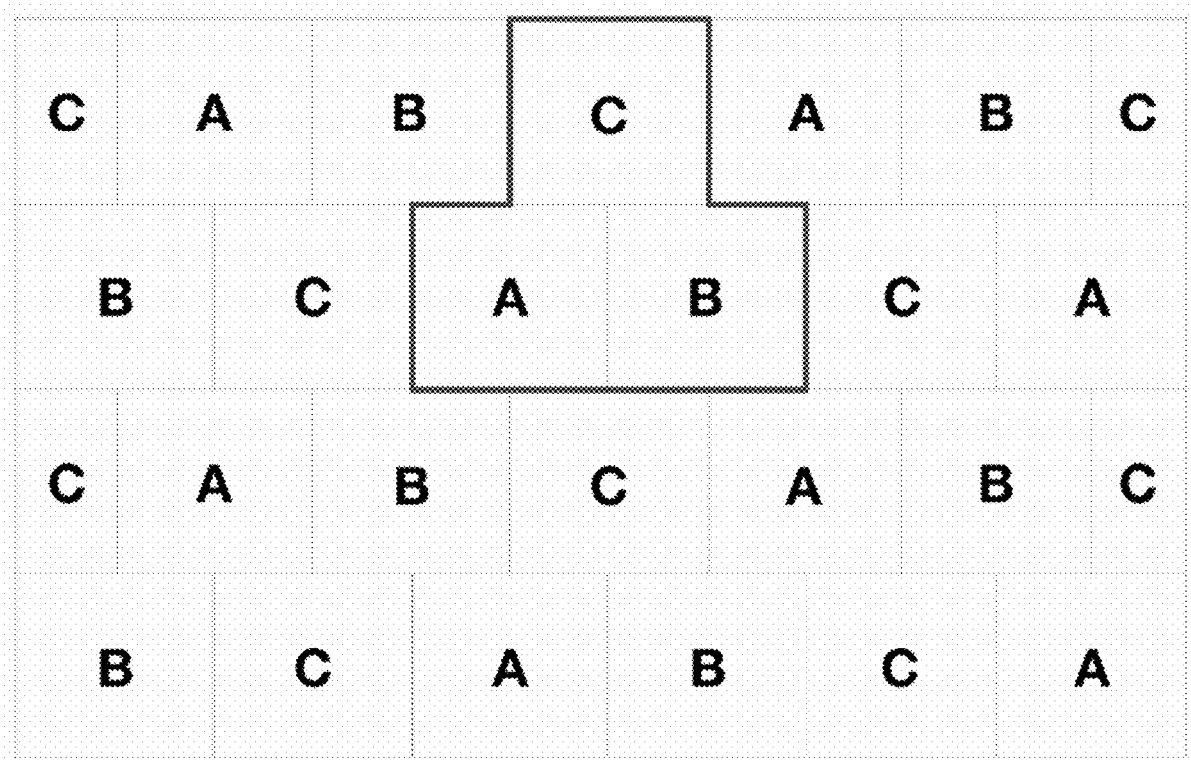

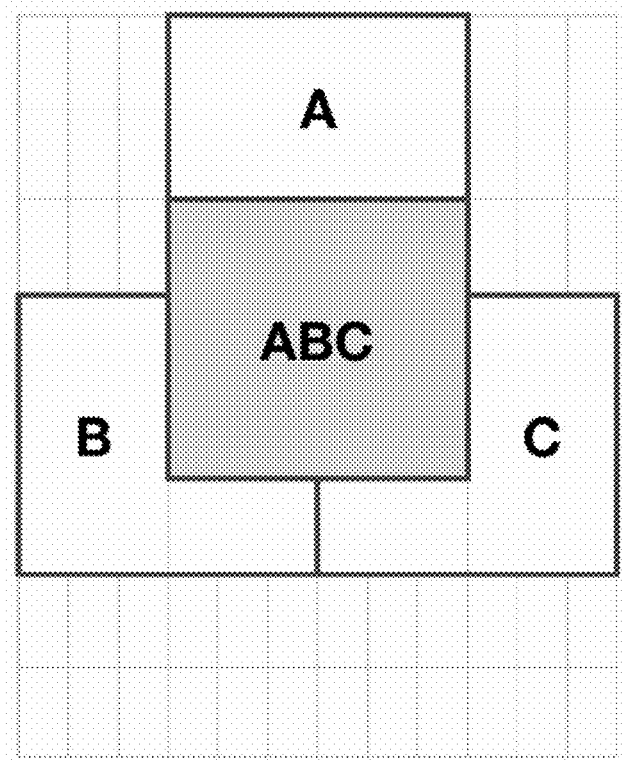

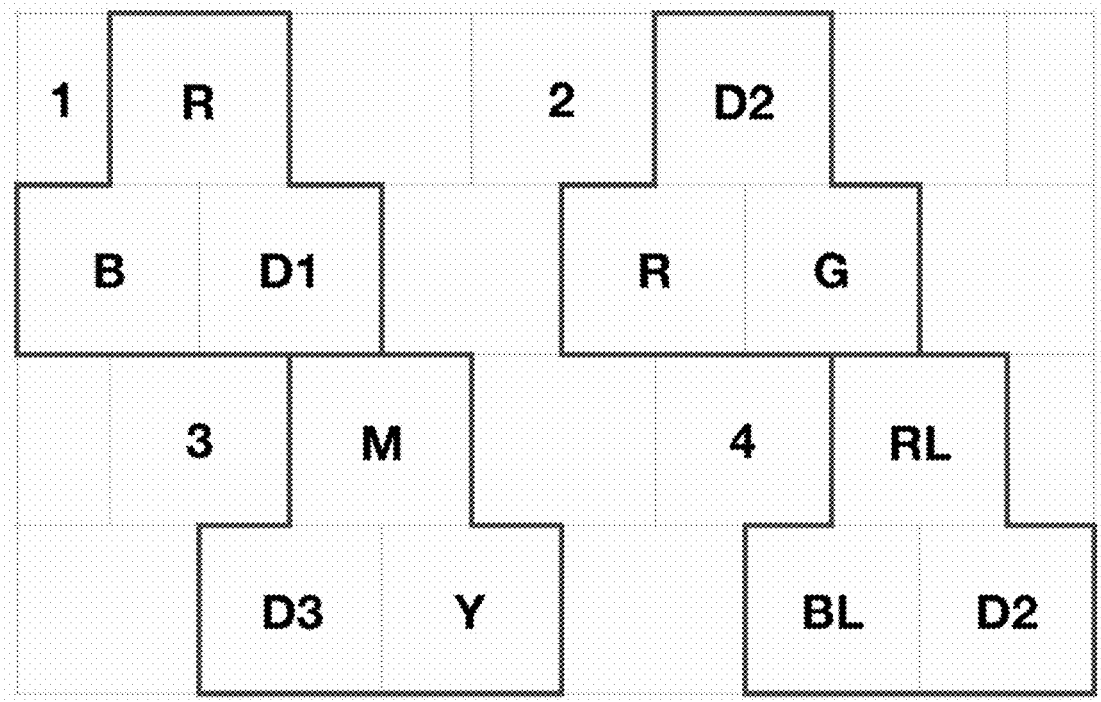

FIG. 11D

```
    C    A    D    B    C
 D  B    C    A    D  B
 A BADC  D    B    C    A
 B  C    A    D    B  C
    D    B    C    A    D
```

FIG. 11E

```
    C    A    D    B    C
 D  B    C    A    D    B
    A    D    B    C    A
 B  C  DCAB   A    D   B  C
    D    B    C    A    D
```

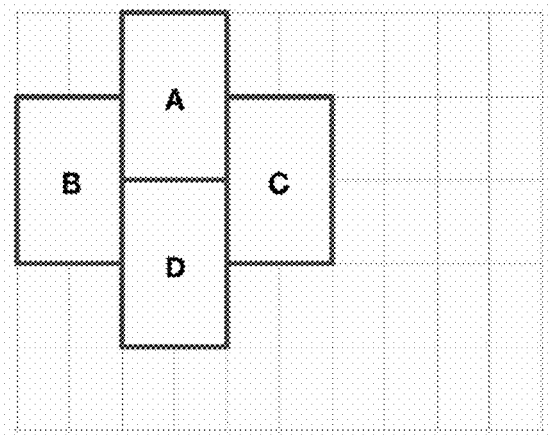
FIG. 11G
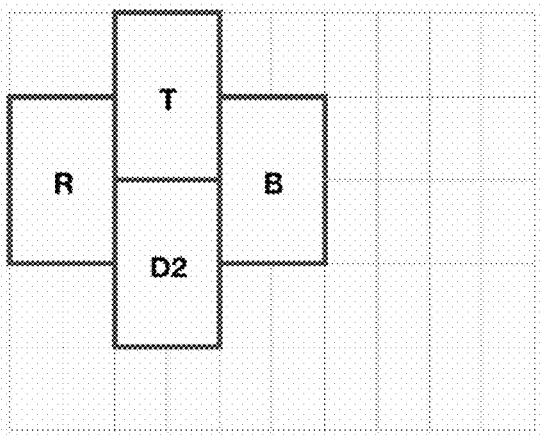
FIG. 11H
FIG. 11J
|   | Opt 11F-1 | Opt 11F-2 | Opt 11F-3 | Opt 11F-4 | Opt. 11H |
|---|---|---|---|---|---|
| A | T  | D2 | Y  | D2 | T  |
| B | D2 | R  | T  | B  | R  |
| C | R  | T  | M  | G  | B  |
| D | B  | G  | D2 | T  | D2 |

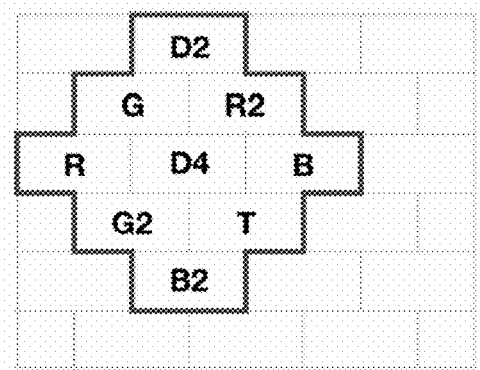
FIG. 12F
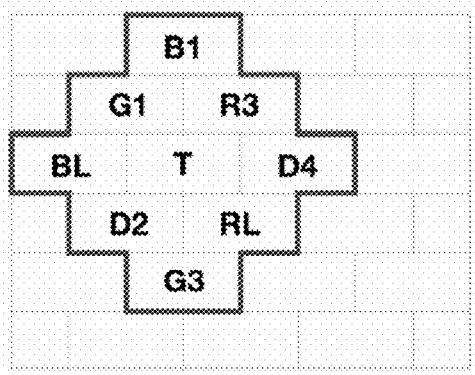
FIG. 12G
FIG. 12H
|   | Option 12F | Option 12G |
|---|---|---|
| A | D2 | B1 |
| B | G | G1 |
| C | R2 | R3 |
| D | R | BL |
| E | D4 | T |
| F | B | D4 |
| G | G2 | D2 |
| H | T | RL |
| J | B2 | G3 |

FIG. 13D

| M | N | A | G | H | J | K |
|---|---|---|---|---|---|---|
| R | B | C | L | M | N |   |
| S | D | E | F | P | R | B |
| G | H | J | K | S | D |   |
| C | L | M |   | N | A | G | H |
| F | P | R | B | C | L |   |
| J | K | S | D | E | F | P |
| N | A | G | H | J | K |   |
| R | B | C | L | M | N | A |

FIG. 13E

| M | N | A | G | H | J | K |
|---|---|---|---|---|---|---|
| R | B | C | L | M | N |   |
| S | D | E | F | P | R | B |
| G | H | J | K | S | D |   |
| C | L | M | N | A | G | H |
| F | P |   | R | B | C | L |
| J | K | S | D | E | F | P |
| N | A | G | H | J | K |   |
| R | B | C | L | M | N | A |

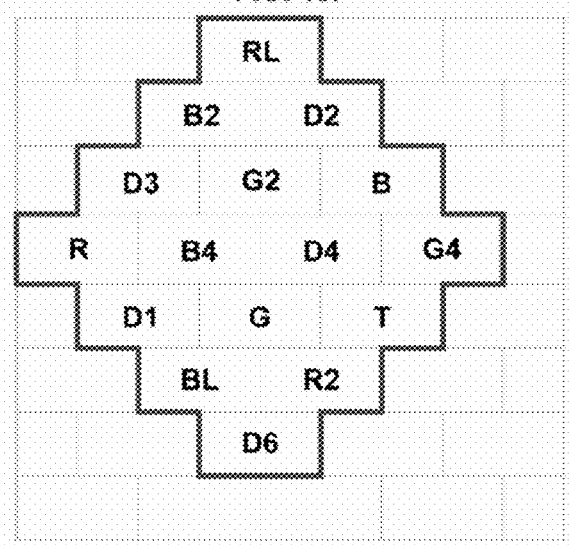
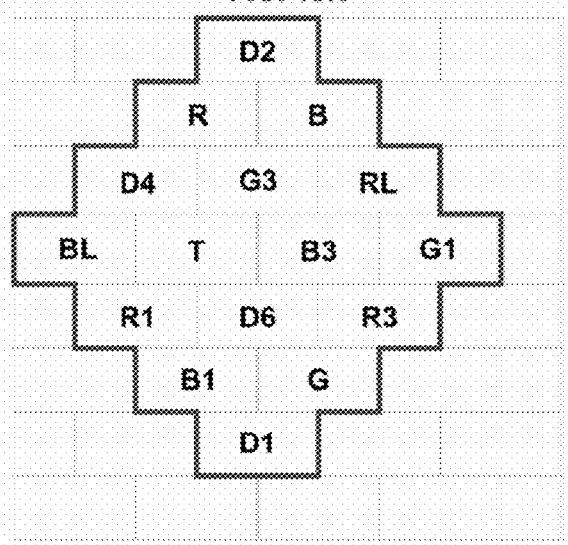
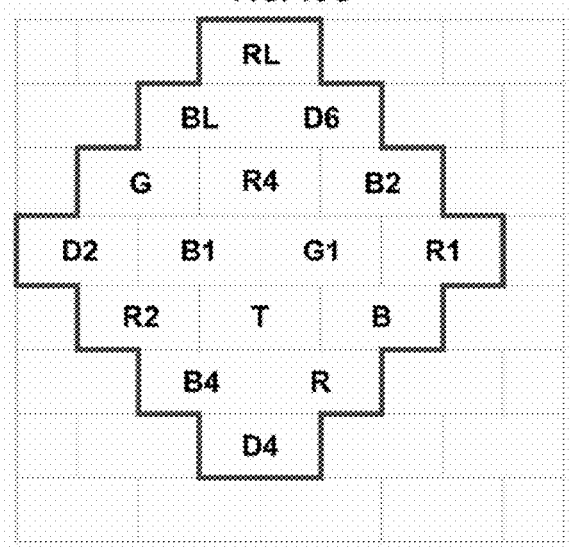
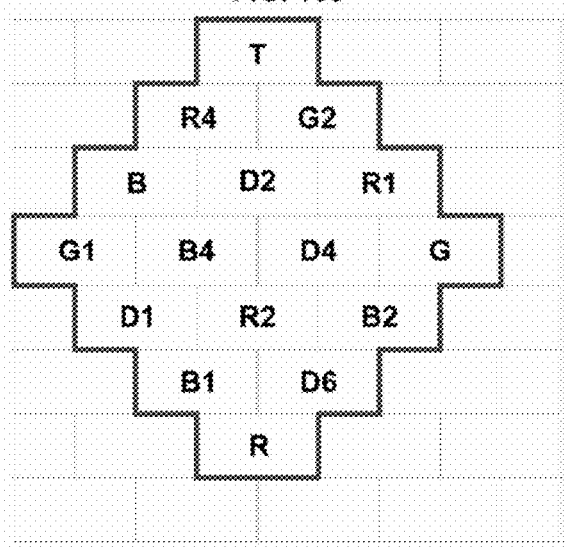

FIG. 13K

| | Option 13F | Option 13G | Option 13H | Option 13J |
|---|---|---|---|---|
| A | RL | RL | D2 | T |
| B | B2 | BL | R | R4 |
| C | D2 | D6 | B | G2 |
| D | D3 | G | D4 | B |
| E | G2 | R4 | G3 | D2 |
| F | B | B2 | RL | R1 |
| G | R | D2 | BL | G1 |
| H | B4 | B1 | T | B4 |
| J | D4 | G1 | B3 | D4 |
| K | G4 | R1 | G1 | G |
| L | D1 | R2 | R1 | D1 |
| M | G | T | D6 | R2 |
| N | T | B | R3 | B2 |
| P | BL | B4 | B1 | B1 |
| R | R2 | R | G | D6 |
| S | D6 | D4 | D1 | R |

FIG. 14A

| T | A | B | S | T | A | B | S | T | A | B | S | T |
| V | C | D | U | V | C | D | U | V | C | D | U | V |
| E | F | G | H | E | F | G | H | E | F | G | H | E |
| J | K | L | M | J | K | L | M | J | K | L | M | J |
| N | P | Q | R | N | P | Q | R | N | P | Q | R | N |
| B | S | T | A | B | S | T | A | B | S | T | A | B |
| D | U | V | C | D | U | V | C | D | U | V | C | D |
| G | H | E | F | G | H | E | F | G | H | E | F | G |
| L | M | J | K | L | M | J | K | L | M | J | K | L |
| Q | R | N | P | Q | R | N | P | Q | R | N | P | Q |
| T |   |   | S | T |   |   | S | T |   |   | S | T |
| V |   |   | U | V |   |   | U | V |   |   | U | V |

FIG. 15A

| R  | G3 | B  | R  | GL | B  |
| D3 | D6 | R3 | D2 | D4 | RL |
| T  | B3 | G  | T  | BL | G  |
| R  | GL | B  | R  | G3 | B  |
| D2 | D4 | RL | D3 | D6 | R5 |
| T  | BL | G  | T  | B3 | G  |

FIG. 14B

| T | A | B | S | T | A | B | S |
|---|---|---|---|---|---|---|---|
| V | C | D | U | V | C | D | U |
| E | F | G | H | E | F | G | H |
| J | K |   | L | M | J | K | L | M |
| N | P | Q | R | N | P | Q | R |
| B | S | T | A | B | S | T | A |
| D | U | V | C | D | U | V | C |
| L | M | J | K | L | M | J | K |
| Q | R | N | P | Q | R | N | P |

FIG. 14C

| T | A | B | S | T | A | B | S |
|---|---|---|---|---|---|---|---|
| V | C | D | U | V | C | D | U |
| E | F | G | H | E | F | G | H |
| J | K | L |   | M | J | K | L | M |
| N | P | Q | R | N | P | Q | R |
| B | S | T | A | B | S | T | A |
| D | U | V | C | D | U | V | C |
| L | M | J | K | L | M | J | K |
| Q | R | N | P | Q | R | N | P |

FIG. 14D

| T | A | B | S | T | A | B | S |
|---|---|---|---|---|---|---|---|
| V | C | D | U | V | C | D | U |
| E | F | G | H | E | F | G | H |
| J | K | L | M |   | J | K | L | M |
| N | P | Q | R | N | P | Q | R |
| B | S | T | A | B | S | T | A |
| D | U | V | C | D | U | V | C |
| L | M | J | K | L | M | J | K |
| Q | R | N | P | Q | R | N | P |

FIG. 14E

| T | A | B | S | T | A | B | S |
|---|---|---|---|---|---|---|---|
| V | C | D | U | V | C | D | U |
| E | F | G | H | E | F | G | H |
| J | K | L | M | J | K | L | M |
| N | P |   | Q | R | N | P | Q | R |
| B | S | T | A | B | S | T | A |
| D | U | V | C | D | U | V | C |
| L | M | J | K | L | M | J | K |
| Q | R | N | P | Q | R | N | P |

FIG. 14F

| T | A | B | S | T | A | B | S |
|---|---|---|---|---|---|---|---|
| V | C | D | U | V | C | D | U |
| E | F | G | H | E | F | G | H |
| J | K | L | M | J | K | L | M |
| N | P | Q | R | N | P | Q | R |
| B | S |   | T | A | B | S | T | A |
| D | U | V | C | D | U | V | C |
| L | M | J | K | L | M | J | K |
| Q | R | N | P | Q | R | N | P |

FIG. 14G

|  | D6 | B |  |
|---|---|---|---|
|  | RL | G2 |  |
| B2 | G | T | R4 |
| D2 | M | B4 | Y |
| R | G4 | C | D8 |
|  | BL | R2 |  |
|  | D4 | GL |  |

FIG. 14H

|   | Option 14G |
|---|---|
| A | D6 |
| B | B |
| C | RL |
| D | G2 |
| E | B2 |
| F | G |
| G | T |
| H | R4 |
| J | D2 |
| K | M |
| L | B4 |
| M | Y |
| N | R |
| P | G4 |
| Q | C |
| R | D8 |
| S | BL |
| T | R2 |
| U | D4 |
| V | GL |

ELECTRONIC IMAGING ENHANCEMENT SYSTEM

This application claims priority to U.S. Provisional Patent Application Ser. No. 62/807,203 filed on Feb. 18, 2019, which is incorporated herein in its entirety by this reference thereto.

BACKGROUND

1. Field of the Invention

The invention relates to a system for enhancement of imaging captured by charged coupled devices (CCD). More particularly, the system herein relates to a light filtering system for the photons communicated to a CCD to capture an image therewith which enhances the image.

2. Prior Art

A charge-coupled device (CCD) is a an electronic imaging device which is well known in the art and employed widely in electronic components such as digital cameras and smart phones for capturing photographic images. In a simplified explanation of such CCDs, photons or light from an image collected by a lens is projected upon the CCD sensor, where the light is collected by a matrix of small image or light sensors with a known location in the grid. In some cases the light sensors are referred to pixels on the CCD grid.

During this communication of an image to the CCD, such as through a camera lens, the lens image is captured by the plurality of light sensors positioned on the CCD. In the conventional functioning of a CCD, it can be divided into two phases: exposure and readout. During the first phase, the CCD passively collects incoming photons or light on each of the light sensors positioned in a grid on the CCD. The light sensors generate electrons which are stored in cells thereof. After the exposure time is passed, the stored electrons are read out one line at a time. During the readout phase, cells are shifted down the entire area of the CCD. Buffers or bins are commonly connected to each of the light sensors on the grid of the CCD, and hold a finite number of electrons.

Each light sensor generates a measured electronic signal such as individual electrons which are employable by counting, using software adapted to such, to generate an electronic video display signal. The generation of a number of such electrons is relative to the light or photons contacting the light sensor. The resulting electronic image can, thus, be divided into small sections or pixels, where each pixel is related to a respective light sensor located upon the CCD and is employed to provide a depiction of a small section of the total image which is reproduced on a video display, projector, or printed image.

Through the employment of software and electronic hardware adapted to the task, each of the individual electronic signals from the grid of adjacent images or light sensors on the CCD, is collected and communicated to imaging software adapted to the task of generating an electronic signal employable by a video display to depict the image captured by the lens of the camera upon that video display. By the term imaging sensor, or light sensors positioned on CCD, CMOS, or similar electronic component, is meant an electronic component which receives incoming light or photons and outputs a photo-generated charge of electrons relative to the light or photons contacting it. Such for example, but in no way limiting may be photo diodes, photo capacitors, or similar components which generate electrons which may be counted to generate an electronic signal proportionate to the amount of light or photons which contact the image sensor and which are representative of each pixel of the captured and resulting image.

Each solid state imaging sensor in the grid of a CCD generates electronic signals relative to the number of electrons generated from the photoelectric effect of the light contacting the individual imaging sensor generating those electrons. Because imaging is not instantaneous and is dependent on lighting conditions, the electrons generated from each imaging sensor are conventionally stored in individual bins or electronic buffers connected to the light sensor. The resulting output electronic signal communicated from each sensor to the software and hardware generating a depicted image, is relative to a counting of the number of electrons generated from light contacting the individual sensor. While counting the electrons generated in each sensor and resulting pixel area of the image provides a relative illumination of that pixel, the sensor itself only generates electrons and does not distinguish between colors.

Conventionally, digital cameras employing such a CCD employ a color identifying filter using a plurality of filter openings, such as the well known Bayer optical filter, to separate electronic signals from each light sensor in the grid on the CCD, into a series of individual colors. Using a color identifying filter, such as a Bayer filter or a similar filtering system and software and electronics adapted to the task of receiving individual electronic output signals relative to the number of electrons generated by each respective imaging sensors and held in a bin or electronic buffer engaged thereto, individual colors, brightness, and pixel saturation of the image to be depicted on display or photo can be calculated. Such is explained in U.S. Pat. No. 3,971,065 which is made a part hereof by this reference thereto. The discerned colors are communicated as electronic signals to different color emitting display pixels on the video display thereby depicting the image captured.

As can be discerned, when employing a CCD having a grid formed of a large number of small adjacent imaging sensors, which can be position-related to small light emitting pixels on a video display or projection for the displayed image, a high resolution image can be achieved.

As noted, this electronic image communicated from a CCD is captured and generated relative a photo-generated charge which generates electrons from each imaging sensor over the duration of time that light or photons are communicated to that imaging sensor on the grid of the CCD. During this exposure time, the resulting photo-generated charge of electrons which are subsequently employed to generate the individual electronic signals from each imaging sensor in the grid during the exposure time, are conventionally stored in a well. Using the resulting photo-generated charge or electrons from each individual well storing them which have been generated by each respective sensor on the CCD, the digital electronic signal for depiction of the image on a display can be generated using software and hardware adapted to such. Each pixel on the video display, using the electronic signals so communicated, will produce light in the appropriate color, saturation, and brightness. This light generation, brightness and saturation in the video signal generated is relative to a counting of the number of electrons stored over the duration of the exposure, from the associated well engaged to the sensor matching the position on the image of the respective pixel.

However, conventional digital photographic light sensors have a maximum number of electrons which can be counted at the pixel or imaging sensor level. If electrons continue to be generated from photons contacting one or more imaging sensors on the CCD, after this maximum has been reached, the count for that imaging sensor will not reflect the actual total number generated for that sensor. Instead, the count will be held at the maximum number that can be recorded and stored. This results in over or under saturation of image pixels and a blooming of the image. Thus, using the system disclosed by Bayer to generate a displayed photo or image from the output signals from the light sensors, overloaded light sensors will cause defects in the formed image.

Saturation and blooming are associated problems that occur in overloaded CCD light sensors under conditions in which either the finite electron charge storage capacity of light sensors such as individual photo diodes, or the maximum charge transfer capacity of the CCD, is reached. When this saturation point occurs at a charge collection site of an individual light sensor on the CCD, the accumulation of additional photo-generated charge or electrons results in an overflow or a blooming, of the excess electrons into adjacent imaging structures on the CCD device. This can cause a number of undesirable effects in the software generated electronic signal relating to the pixel signal values used to illuminate video screen pixels of the captured image. White areas, streaks, lines, and loss of detail are frequent problems associated with such an overflow of electrons from individual light sensor buffers on the CCD. This is especially true where individual electronic buffers are used to hold electrons from multiple light sensors on the CCD grid in segments of the buffer. This overflow problem is exacerbated as the components, such as the light sensors in the grid on the CCD, are made smaller. Thus, forming the CCD with more light sensors in the grid more tightly packed together, can more easily suffer overflow issues.

The longer the duration of exposure, such as for low light photography, the greater the potential that individual sensors on the CCD in areas of higher light or photon communication from the lens will maximize electron output and storage. This of course results in an undercount of the pixels on the final generated image as well as an overflow or blooming effect on structures of the CCD. Such, at a minimum, results in a lack of detail in the brighter areas of the generated video display image or photographic image, as well as other issues.

The forgoing examples of image capturing and reproduction using CCD's, and imitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF INVENTION

The secondary filter system and method herein provides a solution to the overloading of light sensors capturing incoming light on a grid of light or imaging sensors positioned on a conventional charged coupled device (CCD).

As noted above, conventionally employed digital photographic sensors used in cameras and the like, such as CCDs, employ individual sensors such as photo diodes, which are positioned on a CCD in a grid pattern of pixels or individual sensors within an area of the CCD. Each light sensor in the pixel pattern formed on the grid of light sensors emit a photo-generated charge of electrons relative to the light or photons contacting that respective light sensor.

Saturation and blooming are problems which occur in a majority of conventional overloaded charge-coupled device (CCD) image sensors as are limitations with bins or buffers for the electronic output signal attached thereto. As noted, such occurs under conditions in which either the finite charge capacity of individual sensors such as photo diodes, or the maximum charge storage and transfer capacity of the CCD, is reached and exceeded.

Once saturation occurs on an overloaded individual light sensor on the CCD, accumulation of the additional photo-generated charge or electrons from that sensor, results in overflow or blooming of the excess electron charge to adjacent light sensing structures. A number of potentially undesirable effects of such saturation or blooming are reflected the image generated from the light sensors in the grid pattern on the CCD. These range from lack of detail, darkened image areas, white pixels, image streaks, and a general loss of detail in the area of displayed pixels on the generated image, relating to the individual overloaded light sensors on the CCD. Further, such erroneous pixel signal values from overloaded sensors can result in a complete breakdown at the output amplification stage, producing a dark image.

As an example, but in no way limiting, if an individual light sensor on the CCD has a maximum storage or electron count for 1000, any additional electrons generated from light photons contacting that individual light sensor on the CCD, will not be saved to electronic bins or buffers and can in fact overflow to adjacent light sensors on the CCD. This is especially true due to modern miniaturization of circuitry.

Reaching this maximum count will cause a sensor overload and thus, prevent the ability of imaging software employed to generate an output signal for video display or photo reproduction from being able to record structural detail of the captured image in some of the brightest areas of a photo. Such will also affect the color and saturation of individual pixels in the output image generated.

In a conventionally employed Bayer color filter array, the color of light contacting individual light sensors on the grid of such sensors on the CCD can be determined. In a Bayer color filter system, a color filter is positioned between the CCD and the incoming light. The color filter array passes red, green, and blue light to individual selected pixels or light sensors positioned on the CCD.

Using this array, each individual light sensor element positioned in the grid of rows and columns on the CCD is made sensitive to red, green, or blue light by means of a color gel or film or chemical dyes operatively positioned and aligned with the individual light sensors on the CCD. The Bayer filtering pattern which is the most common, is configured to form two green pixels or sensors getting green tinted incoming light, for each red light tinted sensor and blue light tinted sensor. This intentional excess of green light communicated to additional sensors on the grid of the CCD, results in less resolution for red and blue colors. The missing color samples may interpolated using a demosaicing algorithm or ignored altogether by lossy compression.

Thus, a conventional Bayer color filter array is made up of a four pixel repeating pattern. In this pattern, green and red dyes or films are positioned on the top row, and blue and green dyes or films or the like are positioned in a row below. This two column row to row pattern repeats across and down the area of the filter. The Bayer filter's pixels have a 1 to 1 relationship with the electrons generated by each light sensor, with the Bayer filter positioned on or just above the surface of the respective light sensor. However, the Bayer filter does nothing to mitigate the issues noted with overloaded light sensors caused by lack of storage and undercounts and resulting blooming and over saturation.

To determine the actual light color for a specific pixel of a video display depiction of the picture, the electron count from the light sensor in the position on the grid of the CCD relating to a pixel in the video depiction and the individual electron counts from individual light sensors on the grid surrounding it, are employed to calculate and to assign a color value. The top, bottom, the leftmost and rightmost pixels are special cases because the light sensors on the CCD relating to those pixels are not completely surrounded by other light sensors.

Assuming the color ranges, called the dynamic range, for an average phone camera is 10, then these ranges would have an generated electron count, in this example, of 0-2-4-8-16-32-64-128-256-512-1012.

However, as noted in this example, each light sensors on the CCD can only hold 1000 electrons in a bin or buffered storage. Consequently, electrons generated by light or photons contact the light sensors on the CCD, which exceed that maximum are not counted. This has consequences for the quality of the image generated.

Further to this example, the second light sensor on the second row has a green dye on or adjacent it. By using the electron counts of this green filtered light sensor on the second row, and some or all of the red, blue and green filtered light sensors surrounding it, the color value for the pixel area of the photo below the green pixel of the color array.

If these counts are all low values, such as between 2 and 4, then the color value would be a very dark grey. If all of the counts are high, such as between 700 and 1000, the color value for the sensor pixel would be the brightest white. If the red counts are low, 2 or 3, and the blue and green counts are medium, between 25 and 55, then the color value for the digital pixel would be a medium yellow. This process then continues for each and every pixel of the image on the video display or photo. However, as noted, the electron counts employed by the software calculating pixel colors from electron counts of individual and surrounding light sensors, can be easily skewed if the maximum of any one light sensor is exceeded since that effects the pixel on the image relating to it, as well as surrounding pixels.

In the normal brightness range of most digital photos, the red, blue and green values, using a type of Bayer color filter array, will allow one to develop a normal photo. But in the occasional bright area on some photos, where 1, 2 or all 3 of the electrons determining the color of pixels measures or exceeds the maximum amount, (ie. 1,000), then the photo or video display depiction of the captured image, will lack detail and proper coloration and saturation, in the pixels of the image depiction, which correlate to the signal from the image sensors on the CCD, which have exceeded their maximum.

The system herein provides an inexpensive and easily deployed solution to the image issues which occur due to such an undercounting. Where an undercount of electrons is determined to have occurred due to bin or buffer storage limitations or light sensor limits or the like, from a specific light sensor in the grid on the CCD, which relates to a specific pixel on the produced image, then a secondary reading of the count from the nearest light sensor on the CCD thereto is employed. This secondary count reading is derived from this adjacent light sensor, where a filter has been employed which has blocked a precisely known percentage of photons from reaching that adjacent light sensor. Because the precise reduction in photons communicated to the light sensor generates a precise reduction in the number of counted electrons therefrom, an accurate value for the count from that pixel can be calculated to generate the count value for the immediately adjacent pixel suffering the undercount.

In the system herein, a secondary filter, which is adapted to intentionally block more between 75% to 99.999%, or even more, of the light or photons from communicating with only some of the light sensors positioned on the grid of the CCD. These individual known light sensors in the grid on the CCD, will thus generate an electron count which is based on the known light or photon reduction in communication therewith.

Using the example above, one repeating green filter in the filter array filtering light communicated to a light sensor on the CCD, is replaced instead with a repeating darkened or shaded filter, for light being communicated to a light sensor on the grid of the CCD. For this example, but in now way to be considered limiting, the replaced green filter is formed to block 99% of all photons or light from reaching the individual light sensor on the grid of the CCD.

In this example, the communicated count value collected from a filtered light sensor is 132 with the secondary filter blocking 99% of light in place to block such from communicating with the specific light sensor. Since only 1% of the light is contacting this specific light sensor, it is easily calculated by multiplying the electron count generated by the blocked percentage to ascertain that the correct count from this light sensor is actually 13,200 which is well beyond the maximum storage and/or generation ability of that light sensor.

By using the secondary light filter to enable the calculated counting of a 13,200 value for an output of an individual light sensor on the grid of the CCD, a precise level of whiteness, for the specific pixel on a display which correlates to the light sensor with the secondary filter, which is more than 13 the maximum recordable amount for that digital light sensor. If one or two of the values for the color filtered light sensors are less than 1,000, a slight color value can be added to the white value.

While as noted, in everyday use, this problem may only occasionally presents itself. However, employing the filtering system herein, allows for a significant change and enhancement of the design of the underlying digital light sensors in the grid of the CCD. By measuring and calculating a count of 13,100 from a light sensor which normally could not provide such, the pixel size or size of each electronic light sensor on the grid of the CCD, can be significantly smaller.

This reduction in the size of the light sensors allows for significant enhancements to digital cameras employing CCD's. First, because the noted issues with CCD saturation and blooming can be eliminated, CCD's with a significant increase in the number of light sensors correlating to image pixels can be formed. Thus, resulting digital pictures with increased structure and detail can be produced with much better rendition of color, brightness, and saturation values for each pixel in the digital image.

Second, image capturing CCD's can be made smaller, and still have the same number of light sensors thereon in the grid on the CCD which relate to the pixels of a digital image. In all modes of the system herein, the secondary filter of this system can be configured to block the photons from reaching specific light sensors in the grid of the CCD, by employing a secondary light filter in conjunction with the Bayer color filter array or a similar color filter array. The secondary filter may be located between the lens and the light sensors in the grid on the surface of the CCD. The secondary filter may be located between the lens and the Bayer or other color filter, or between the light sensors on a CCD and the Bayer or other color filter.

To filter or block incoming light or photons from communicating with specific light sensors in the grid on the CCD, the corresponding light sensor in its position on the grid of the CCD can be coated with or have films thereon with one or more layers of the three dyes used for existing red, blue and green light filtration, and/or a grey/black dye or film, which has the calculated light blocking in the desired blocking percentage.

Alternatively, the array of light sensors in the grid located on the CCD can be overlain with a film forming the secondary filter. This secondary filter can be formed with a pattern to only cover and thereby filter light being communicated only to the desired individual light sensors to be blocked by the precise percent of light blockage of the secondary filter.

Alternatively, the secondary filter can be configured in a position to filter the light to some or all of the light sensors in the grid on the CCD. Once so positioned, material from the secondary filter may be removed manually such as by cutting or laser perforation, or by electromagnetic force form the secondary filter to the desired blocking percentage per light sensor on the grid.

With this secondary filter in place, with known light blocking values, the light sensors on the grid of the CCD can thus provide count values for light which significantly exceed that of conventional CCD devices which as noted are limited by a finite charge capacity of individual sensors, a finite storage or buffer capacity for generated electrons, and/or a limited maximum charge transfer capacity of generated electrons. This increase in performance can be provided at a fraction of the cost of forming CCD's with increased storage and charge capacity.

The light transmission blocking of the filter system herein, can be formed using dyes and film and other light transmission filtering media which can be formed to block a known percentage of light transmission. For example films can be formed photographically with dots or lines or combinations thereof to block a known percentage of light through the film. Dyes can also be formed with particulate therein to block a known percentage of light transmission.

In addition to film and dye, the system herein can employ a frame configured to mount above or below, the conventional Bayer filter to work in combination therewith. The body in this mode is formed of a thin skeletal precision casting or the like, which positions individual openings in the frame to surround and be positioned above some or all of the light sensors positioned in the grid on the CCD. Film or other light blocking media is positioned within the individual openings, or, the openings can have sidewalls with holes formed therein, such as by laser beam cutting, to allow for a known amount of light through the openings and onto specific light sensors in the grid on the CCD.

Finally, while this application is focused upon a structurally formed light transmission filter formed of light blocking media for positioning between the incoming light and electronic sensors in the grid on a CCD, the calculated reduction in light transmission can be accomplished by software switching of the output from individual light sensors on the grid before the electrons are output to a buffer or bin. For example they might be turned off for micro second increments during the total duration of exposure to reduce the output of electrons to the bin or buffer which are counted.

With respect to the above description, before explaining at least one preferred embodiment of the herein disclosed CCD light filtering system in detail, it is to be understood that the disclosed system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed CCD secondary filtering system. It is important, therefore, that the claims be regarded as including such equivalent construction and methodology insofar as they do not depart from the spirit and scope of the present invention.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The accompanying drawings, which are incorporated herein and form a part of the specification, illustrate some, but not the only or exclusive, examples of embodiments and/or features of the filtering system for a CCD and the like herein. It is intended that the embodiments and figures disclosed herein are to be considered in all cases illustrative, rather than limiting.

In the drawings:

FIGS. 1C through 1F, are pictorial representations showing preferred sensing element patterns for practicing the invention in a basic 4 (2×2) cell iteration for either color sensing or non-color sensing digital sensors such as a CCD.

FIG. 1G depicts the computer controller for the system herein which is configured to receive signals from individual light sensors on the CCD and to use adjacent light sensors which align with filter openings in the secondary filter to calculate a corrected light signal reading for an overloaded light sensor, or to cause a correlating filter media in a filter opening aligned with an overloaded light sensor, to darken and lower the visible light reaching the overloaded light sensor.

FIG. 1H depicts a computerized controller for the system herein which is configured to receive output signals from individual light sensors on a CCD and ascertain each of which is overloaded.

FIGS. 2A through 2H, are pictorial representations showing preferred sensing element patterns for practicing the invention in a 5 (1×3×1) cell iteration.

FIGS. 3A through 3H and 3J through 3N, are pictorial representations showing preferred sensing element patterns for practicing the invention in a 9 (3×3) cell iteration.

Figures 4A, 4B, 4C, 4D:
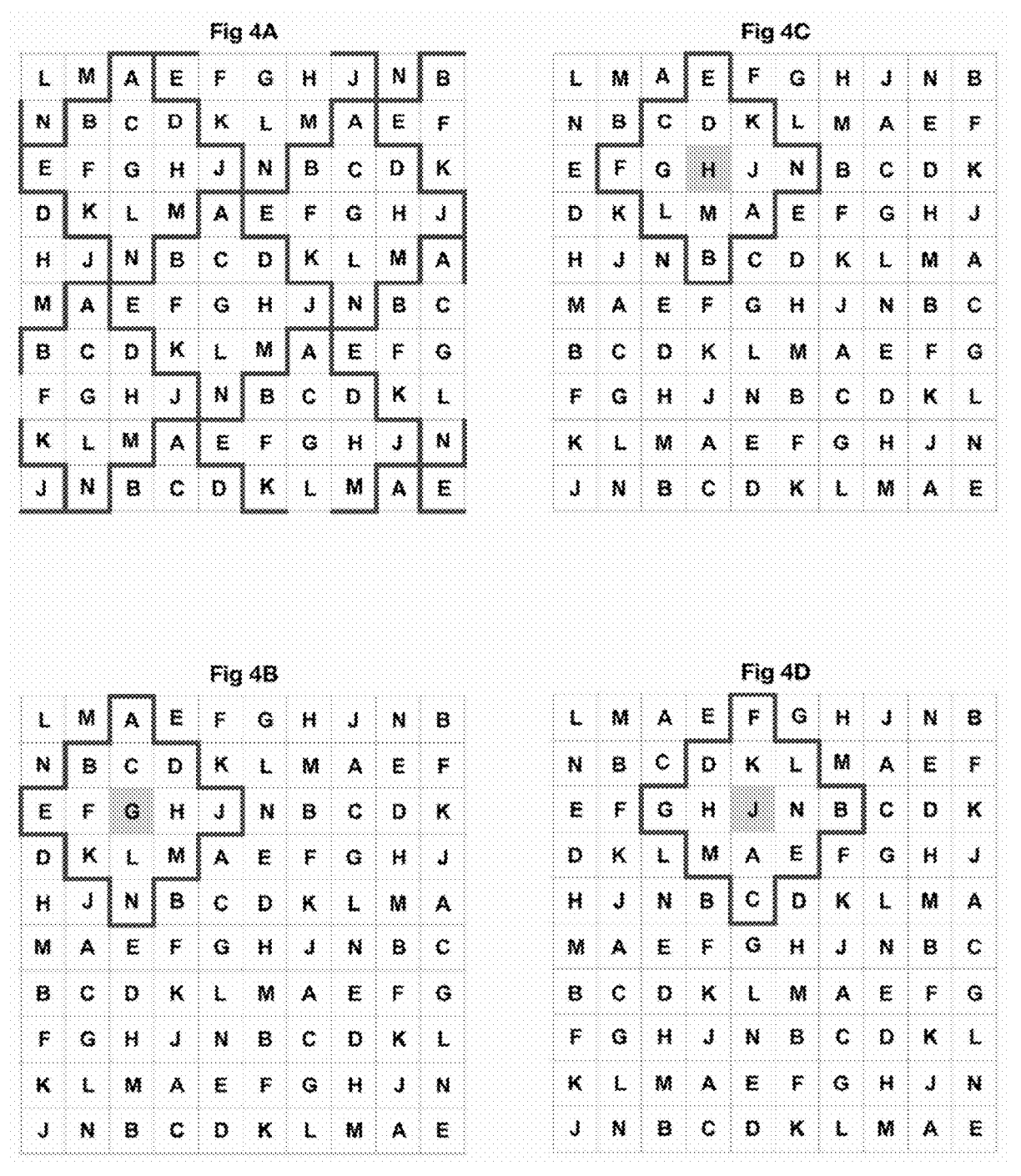

FIGS. 4A through 4H and 4J and 4K are pictorial representations showing preferred sensing element patterns for practicing the invention in a 13 (1×3×5×3×1) cell iteration.

FIGS. 5A through 5H are pictorial representations showing preferred sensing element patterns for practicing the invention in a 25 (1×3×5×7×5×3×1) cell iteration.

FIGS. 6A through 6G are pictorial representations showing preferred sensing element patterns for practicing the invention in a 16 (4×4) cell iteration.

FIGS. 7A through 7E are pictorial representations showing preferred sensing element patterns for practicing the invention in a 12 (2×4×4×2) cell iteration.

Figures 8B, 8C, 8D, 8E:
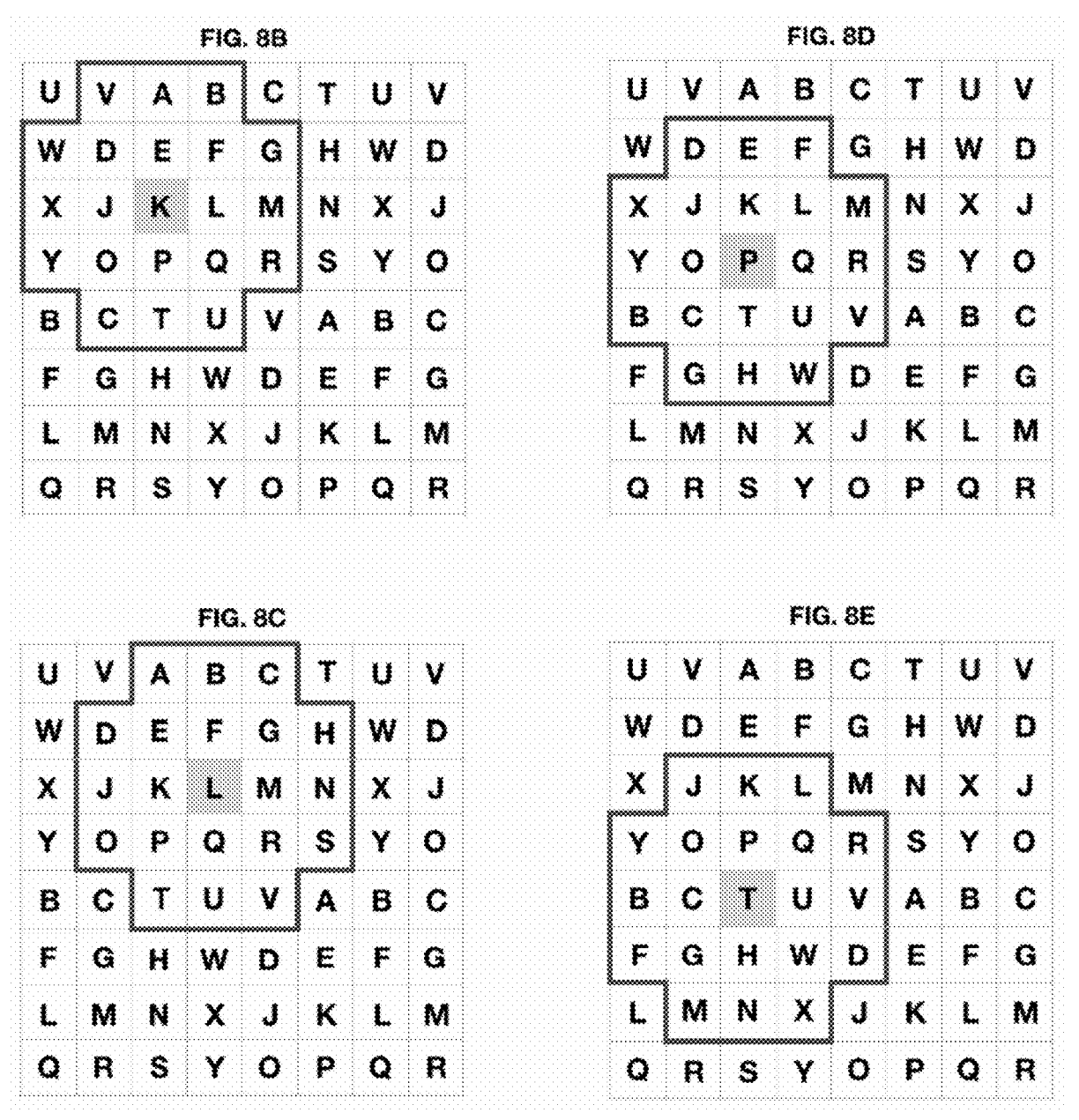

FIGS. 8A through 8G are pictorial representations showing preferred sensing element patterns for practicing the invention in a 24 (3×3×5×5×5×3) modified cell iteration.

FIGS. 9A through 9H and 9J through 9L are pictorial representations showing preferred sensing element patterns for practicing the invention in a 3 (1×2 or 2×1) cell iteration.

FIGS. 10A through 10H are pictorial representations showing preferred sensing element patterns for practicing the invention in a 3 (1×2 offset or 2×1 offset) cell iteration.

FIGS. 11a through 11H and 11J are pictorial representations showing preferred sensing element patterns for practicing the invention in a 4 (1×2×1) cell with offset iteration, and with a 1.0 width to 0.666 height ratio, for color and non color digital sensors.

Figures 12C, 12D, 12E:
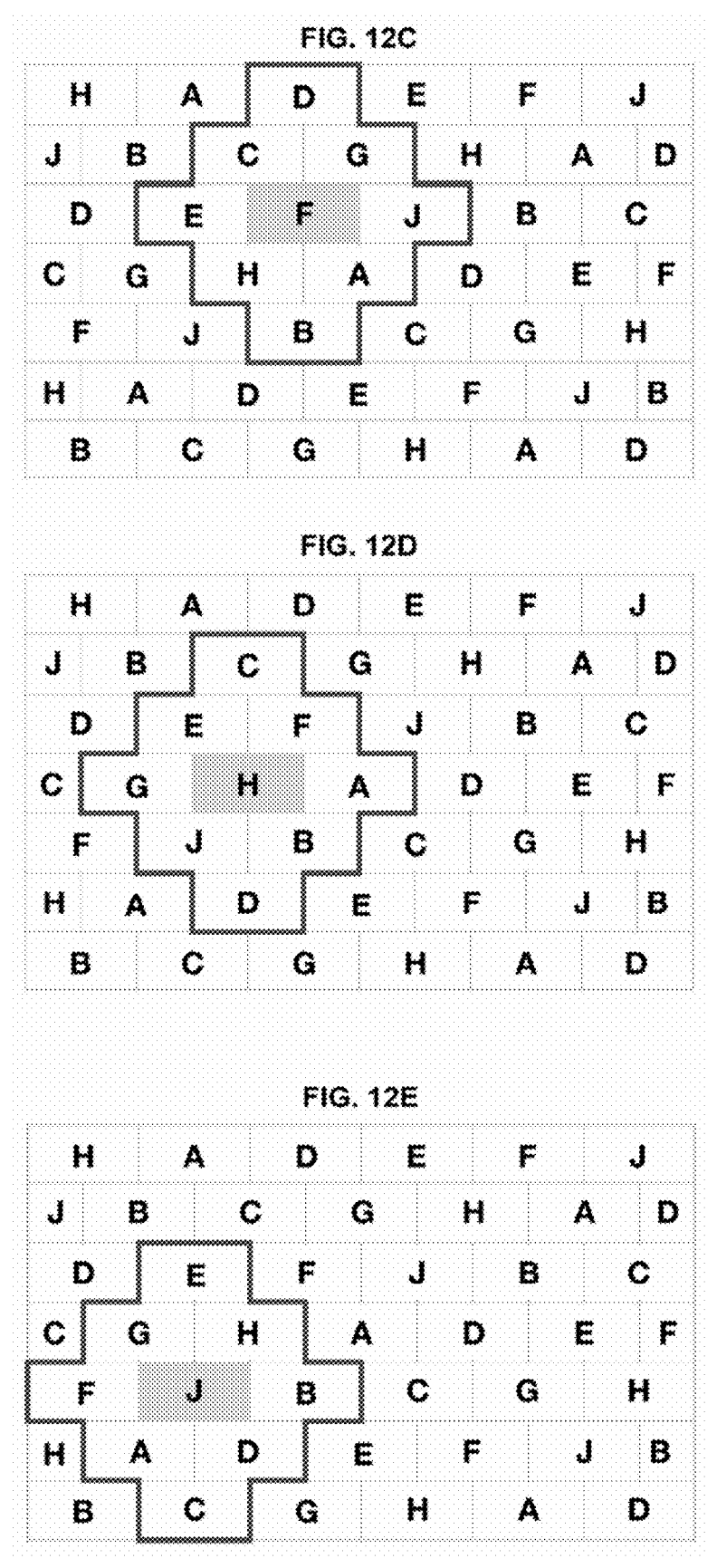

FIGS. 12A through 12H are pictorial representations showing preferred sensing element patterns for practicing the invention in a 9 (1×2×3×2×1) cell with offset iteration, and with a 1.0 width to 0.6 height ratio.

FIGS. 13A through 13H and 13J and 13K are pictorial representations showing preferred sensing element patterns for practicing the invention in a 16 (1×2×3×4×3×2×1) cell with offset iteration, and with a 1.0 width to 0.57 height ratio.

FIGS. 14A through 14H are pictorial representations showing preferred sensing element patterns for practicing the invention in a 20 (2×2×4×4×4×2×2) cell iteration, and with a 1.0 width to 0.57 height ratio.

FIG. 15A is a pictorial representation showing preferred sensing element patterns for practicing the invention in a 9 (3×3) cell iteration.

Figure 1A:
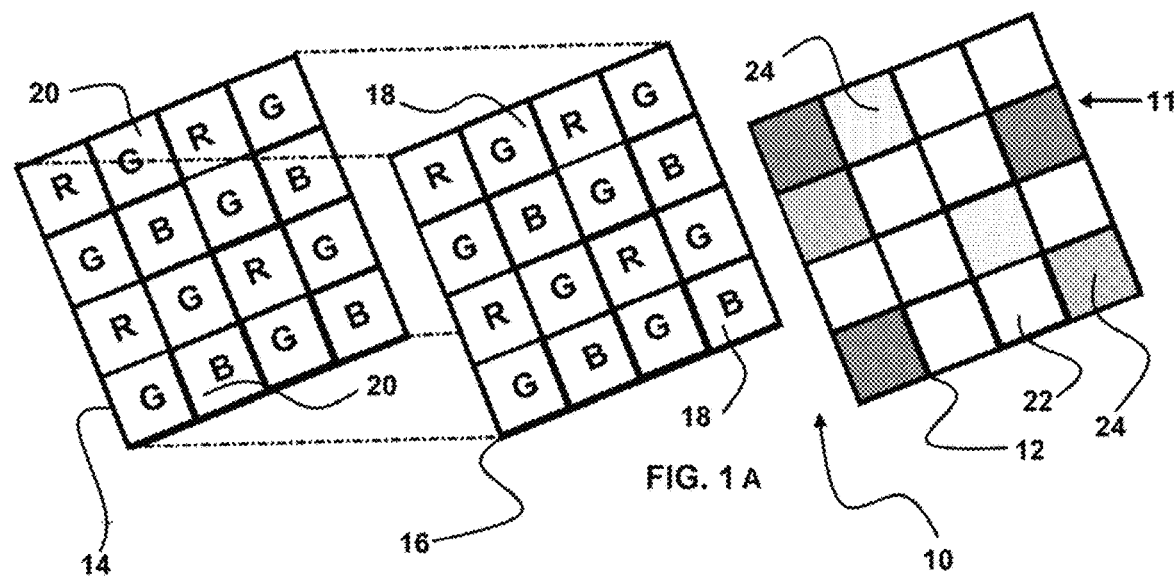
FIG. 1A shows a favored mode of the device formed as a film or frame device herein having a plurality of openings with light filtering media therein, which is positioned to filter and block a percentage of the light or photons communicating to and through a Bayer filter and on to the individual light sensors in the grid on the light sensing element such as a CCD.

Other aspects of the disclosed light filtering device for digital imaging herein will be more readily understood when considered in conjunction with the accompanying drawings, and the following detailed description, neither of which should be considered limiting.

DETAILED DESCRIPTION OF EMBODIMENTS

In this description, any directional prepositions if employed, such as up, upwardly, down, downwardly, front, back, first, second, top, upper, bottom, lower, left, right and other such terms referring to the device or depictions as such may be oriented, are describing it such as it appears in the drawings and are used for convenience only. Such terms of direction and location are not intended to be limiting or to imply that the device herein has to be used or positioned in any particular orientation.

Further, the term CCD is employed herein for convenience and because a large portion of digital cameras and imaging devices employ CCD's. However, CCD as used herein is meant to refer to any electronic light sensing element, which has a plurality of individual light sensors positioned in a grid or as pixels thereon, where each of the individual light sensors generate an electronic signal, or electrons, relative to the number of photons or amount of light which are communicated to each individual electronic sensor positioned in the grid on the electric light sensing element.

Color identifying filter, as employed herein, refers to a Bayer filter or similar colorizing filter which employs filter openings having a series of color filters therein which project colored light upon individual light sensors on the CCD. The signals from the individual light sensors with differing colorized light projected thereon, are employed to determine the color of individual pixels in the video depiction which the incoming light from the lens will produce on a video screen or photo.

Light filter media, light filter, or filter material or filtering element as used herein, is meant to be any light filtering media, such as film, foil, dyes, tinted glass, or a photo chromatic film, or other light filtering media structure, which are configurable to transmit a known first percentage of total light or photons therethrough to an aligned light sensor in the CCD, and to block the remainder or a second percentage of light or photons from passage therethrough.

For example, films can be formed with dyes or photographic dots and lines, to cover areas which block a percentage of light transmission therethrough. Alternatively but not limiting, wall structures can be formed which block all light transmission through the filter openings with apertures therethrough which pass a certain percentage of the photons or total light, and block the remainder. When filter media is employed which is fixed in ability to transmit light therethrough, the secondary filter herein will employ a repeating pattern of filter media which blocks visible light to correlating light sensors on the CCD, and employ a computer controller to ascertain when an overload occurs and use adjacent light filtered light sensors to calculate a corrected light reading for the overloaded light sensor.

Additionally employable as a film positioned in some or all of the filter openings of the secondary filter herein, can be a photo chromatic film which will darken relative to an amount of visible light being communicated from an incoming light stream, to each of the individual filter openings in the secondary filter herein. While in years past, such photo chromatic films only darkened due to a UV light communication, in recent years a modified dirylethene derivative of such photo chromatic film has been developed which can photocyclolize when contacted by visible light under 405-nm.

Positioning this visible light photo chromatic film in each of the filter openings of the secondary filter herein, will thus cause each to react separately to visible light contacting and communicating through the photo chromatic film, located in each of the filter openings. Thus, each filter opening will react separately, when too much visible light communicates to the visible light photo chromatic film therein, and darken to thereby to prevent excessive much light from reaching the aligned correlating light sensor on the CCD.

Still further, while more involved and expensive, individual liquid crystal filters can be positioned in each of the filter openings of the secondary filter. The computer controller having a computer processor and memory can employ computer executable instructions running in memory, to sense a level of visible light contacting each of the light sensors in the grid on the CCD. Based on the electronic feedback signal from each of the light sensors on the CCD, the controller will employ the computer executable instructions to darken or lighten a liquid crystal filter (LCD) located in each respective filter opening aligned with each of the light sensors on the CCD, according to the visible light reaching and communicating through that filter opening. Thus, when a light sensor on the CCD, communicates an electronic signal relative to incoming light reaching it, to the controller of the LCD filter media, that a respective light sensor on the CCD is being overloaded and will overflow, the controller will energized the LCD in the correlating filter opening, to darken and bring the visible light contacting the correlating light sensor on the CCD, to a proper level to prevent overload.

Additionally, in the simplest modes of the system herein, as shown in multiple drawings, the secondary filter herein employs a repeating pattern of filter openings having light blocking filter media therein of a determined percentage of visible light blocking. In this mode of the system, the controller will receive signals from the light sensors on the CCD as to a current amount of visible light reaching it. The controller will employ computer executable instructions running in memory on the controller to determine that one or more of the light sensors on the CCD, is being overloaded with visible light. The controller will override the output of any overloaded light sensors by employing signals from the adjacent light sensors in the repeating pattern, which have the light transmitted thereto, darkened by a correlating filter, opening in the repeating pattern. Using the electronic signals from the light sensors adjacent overloaded sensors, which are filtered in the repeating pattern, the controller will determine a corrected electronic signal from the respective overloaded light sensor. The controller will insert the corrected reading for the overloaded light sensor into the photograph as it is digitally stored.

Now referring to drawing of FIGS. 1A-14H, where similar components are identified with like numeral references, there is seen in FIG. 1A a favored mode of the system 10 herein disclosed which employs a light filter 12 to alter the light transmission from a lens to a light sensing element or CCD 14.

As shown, a secondary light filter 12 is formed in a planar configuration with a frame having a perimeter edge and a plurality of individual filter openings 22 in rows and columns on the secondary light filter 12. The light filter 12 may be positioned in-between the incoming light 11 stream from a lens (not shown but well known) and a color determining filter such as a Bayer filter 16. The secondary light filter 12 can also be located between the Bayer filter 16 and the light sensors 20 on a CCD 14. As noted above, the Bayer filter is formed of a plurality of individual filtering cells 18. Each cell in the Bayer filter 16, is positioned to align with a respective light sensor 20 on the grid of the CCD 14. Thus, all light reaching a light sensor 20 passes through a respective individual aligned filtering cell 18. Each cell 18 of the Bayer filter 16, has one of a plurality of different colorizing light transmitting filters positioned therein, such as red, green and blue. The colorizing light transmitting filters form individual colorized light streams where each such colorized light stream contact only with one aligned light sensor 20 on the CCD 14.

The electronic light sensing element or CCD 14 has a plurality of individual electronic light sensors 20 positioned in a grid pattern on the CCD 14. Each such light sensor 20 as noted above, generates an electronic output signal such as a number of electrons. This electronic output signal, from each respective light sensor 20, is directly proportional to the amount of photons or incoming light 11, from the incoming light 11 stream, which contacts that respective individual sensor 20.

As noted above, such an electronic output signal can be a number of electrons which the respective light sensor 20 generates from incoming light 11 contacting it, which are stored in a buffer and later used to calculate the coloration and brightness of a pixel correlating to that light sensor 20, as depicted on a graphic display. Other electronic output signal schemes are employable also so long as each of the light sensors 20 outputs the electronic output signal relative to the amount of visible light or photons reaching it.

In combination with the Bayer filter 16, software or computer executable code running on a computer or controller and adapted to the task of counting electrons or otherwise employing each output signal from each such light sensor 20, can thereby generate pixels on a display screen correlating to each light sensor 20 output, in a correct color and brightness for that corresponding pixel.

As shown, the light filter 12, has filter openings 22 located in a grid pattern thereon. Some of the filter openings 22 have light filtering media 24 positioned therein where the light filtering media 24 is configured to block a known percentage of the total light or photons, communicated in the incoming light 11 stream from a lens. Each of the individual filter openings 22 is positioned to align with a specific light sensor 20 located in the grid of light sensors 20 on the CCD 14 whereby light or photons from the incoming light 11 stream, must pass through a respective filter opening 22 before communicating upon one of the light sensors 20.

A first portion of the individual filter openings 22 are configured to pass 100 percent of the incoming light 11 stream to a respective light sensor 20 on the CCD 14 with which the filter openings 22 align. Secondary filter openings 22 have light filtering media 24 positioned therein.

The light filtering media 24 positioned within the secondary filter openings 22 is formed to block a known first percentage of the incoming light 11 from the incoming light stream 11 from a lens, from communicating to a light sensor 20 on the CCD 14 with which the filter opening 22 with that light filter 24 aligns. This first percentage of light, which is blocked by the filtering media 24 in the filter openings 22 of the light filter 12, ranges between 75% to 99.999% of the total incoming light 11.

As noted above, in the system 10 herein, the electronic light sensors 20 in the grid on the CCD 14, each generate a respective electronic output signal, such as a number of electrons which are stored in a buffer, which directly correlates to the amount of light or photons from the incoming light 11 stream which communicate upon that light sensor 20. Using the light filter 12 herein, either in a repeating pattern of filter openings 22 with filter media therein, or a photo chromatic film located in all of the filter openings 22, or LCD's activated by a controller located in respective filter openings 22, a reduced electronic signal output from each light sensor 20 which has incoming light 11 blocked by the known percentage, is lowered by an amount correlating to the percentage of blocked light.

Thus, for each such reduced electronic signal from a respective light sensor 20 which has had a portion of its light stream blocked by light filtering media 24, the reduced electronic output signal can be multiplied by a filter-factor which will provide an outcome which correlates to the corrected electronic output signal, that the reduced electronic signal would be, if the incoming light 11 had not been filtered by filtering media 24. Where an immediately adjacent light sensor 20 has been overloaded, the output signal therefrom can be altered by the controller 13 (FIG. 1H) according to computer executable instructions running thereon, using the output signals from one or a plurality of adjacent positioned light sensors 20, which have light filtered by filter media 24 located in an aligned filter opening 22 of the secondary light filter 12 herein.

For example, if the filtering media 24 is formed to block 50% of the incoming light 11 stream from communicating to the aligned light sensor 20 on the CCD 14, then the reduced electronic signal output from the aligned light sensor 20, is multiplied by a filtering factor of 2, to provide a corrected electronic signal output for that individual light sensor 20. Using this corrected electronic signal output, computer executable code, running on a controller, can generate an output signal to correctly color and illuminate the pixel on a video display which correlates to the light sensor 20 in the grid on the CCD 14. This operation is employed primarily where the output signal from a light sensor 20 located immediately adjacent to an overloaded light sensor 20, which receives filtered light from the repeating pattern of filter openings 22, is used to correct the adjacent overloaded light sensor 20 output signal. By adjacent is meant positioned on the grid of light sensors 20 on the CCD, above, below, or on either side of an overloaded light sensor 20. The controller 13 can use output signals from all adjacent light sensors 20 which have their communicated light from the incoming light 11 stream, filtered by the filter media of the secondary filter 12.

Figure 1B:
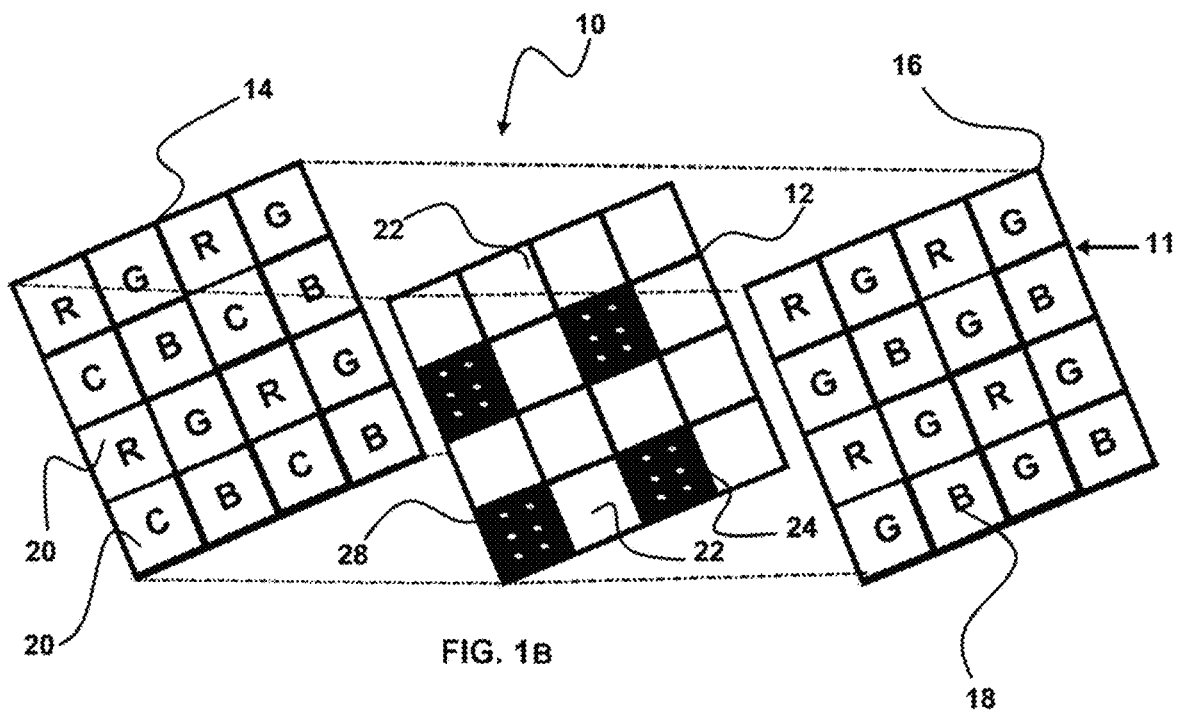
FIG. 1B shows the device herein situated in-between a filter such as a Bayer filter and the individual light sensors positioned in a grid on a light sensing element such as a CCD.

FIG. 1B shows the system 10 herein with the light filer 12 situated in-between a filter such as a Bayer filter 16 and the individual light sensors 20 positioned in a grid on a light sensing element such as a CCD 14. The individual filter openings 22 on the light filter 12, as with all modes of the disclosed system 10, each align with a specific light sensor 20 on the CCD whereby all light or photons communicated thereto from an incoming light 11 stream, must pass first through the filter opening 22 aligned with a specific light sensor 20.

As shown in FIG. 1B, the light filtering media 26 is formed of solid material which blocks all of the light transmission therethrough. One or a plurality of openings 28 communicate through the filtering media 26 to communicate light from the incoming light 11 stream, directly to an aligned and correlating light sensor 20 located on the grid of the CCD 14. However, the light filter 12 formed as in FIG. 1A could also be employed in the positioning of FIG. 1B, with the light filtering media 24 formed to block light in a known percentage. The light filter as in FIG. 1B could also be positioned as in FIG. 1A.

As with the secondary light filter 12 described above in FIG. 1A, the reduced electronic signal from any of the light sensors 20 which have light transmission reduced by the filter media 24 or 26, can be multiplied by the filtering factor correlating to the reduction in light transmission of the filtering media, to arrive at the corrected electronic signal output which is employed as noted above to color and illuminate the pixel on a display screen correlating to the individual light sensor 20 on the CCD 14.

As also noted above, the secondary light filter 12 can be configured to only filter and reduce light transmission to some of the individual light sensors 20 on the grid of the CCD 14 in a repeating pattern of such reductions. Various configurations and light reductions and patterns for light reduction to one or a plurality of the sensors 20 on the array of the CCD 14 are shown in figures of such are shown in FIG. 1C through FIG. 14H.

As noted, FIGS. 1C through 1E, are pictorial representations showing preferred light sensors in patterns for practicing the system herein in a basic 4 (2×2) cell iteration for either color sensing or non-color sensing digital sensors such as a CCD 14.

Figures 1F, 1G, 1H:
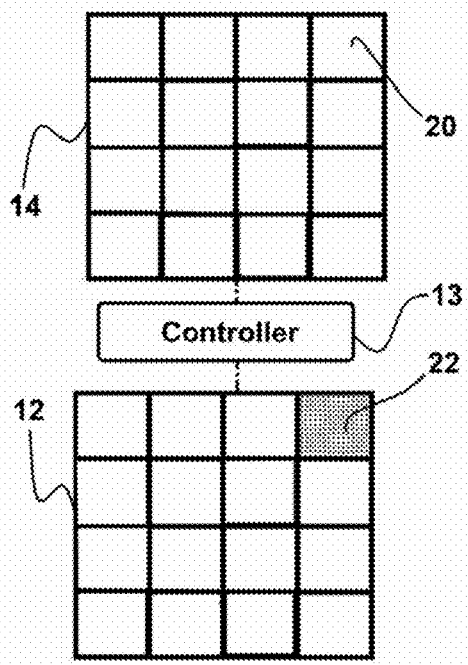
Figures 2G, 2H:
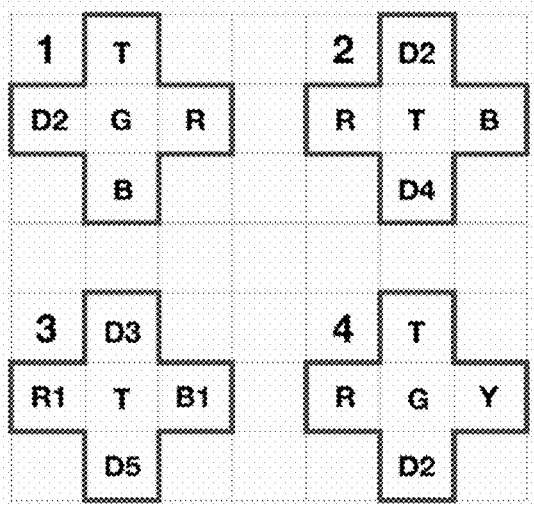
Figure 5F:
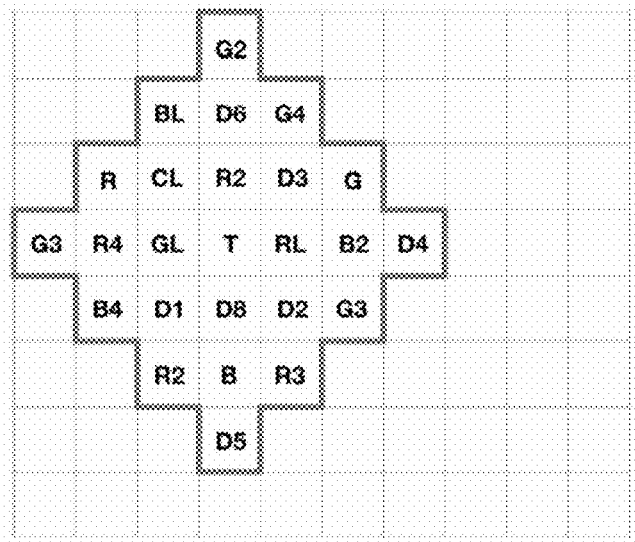
Figure 5G:
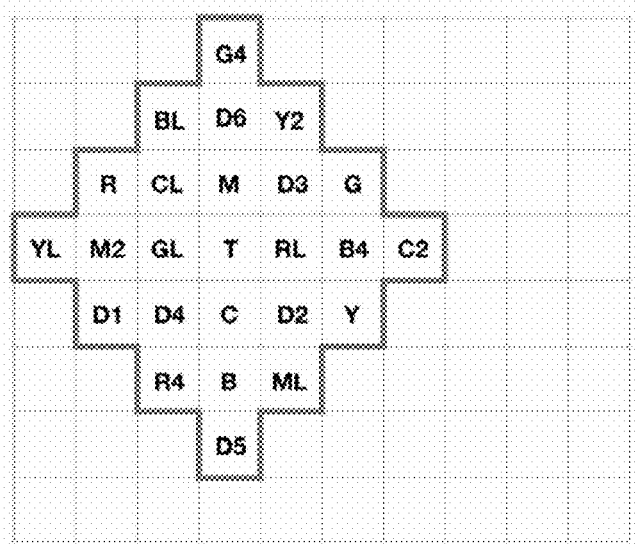
Figure 9G:
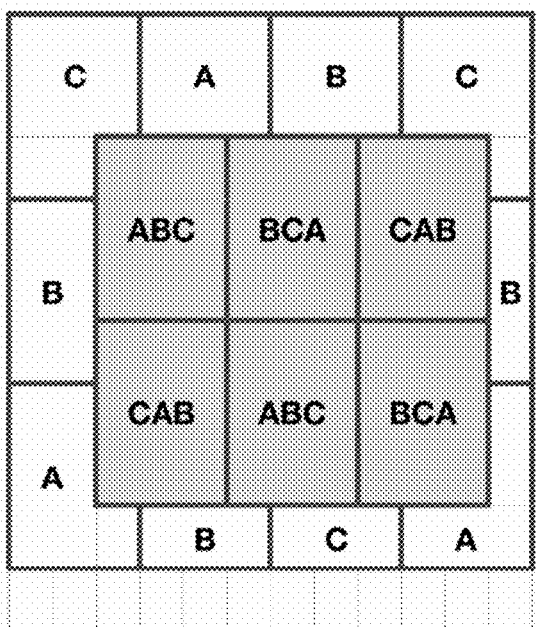
Figure 9K:
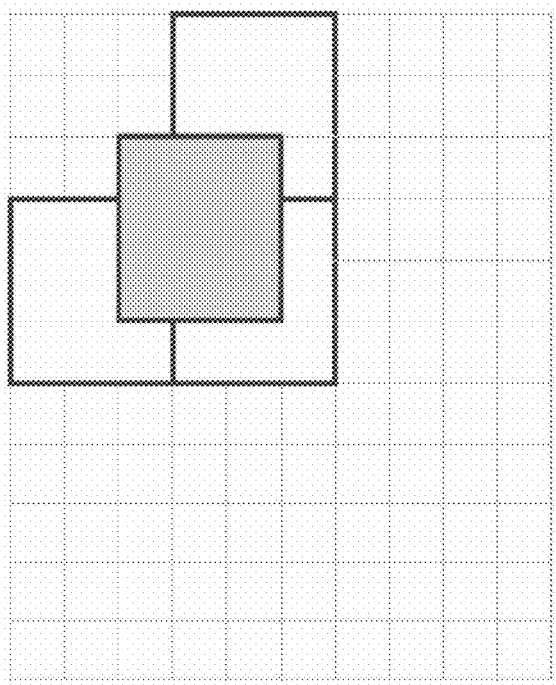
Figure 9H:
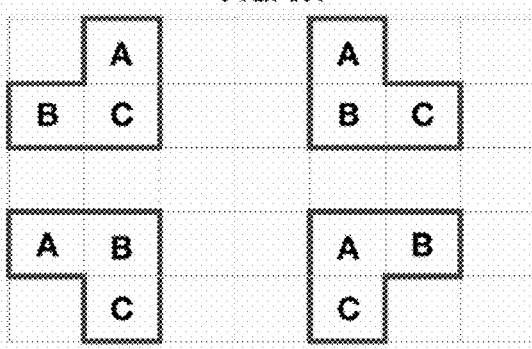
Figure 9J:
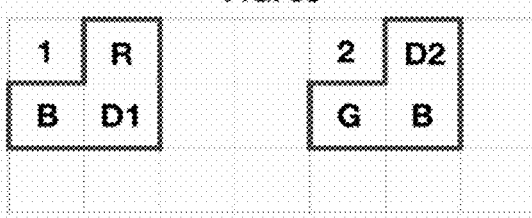
Figure 10D:
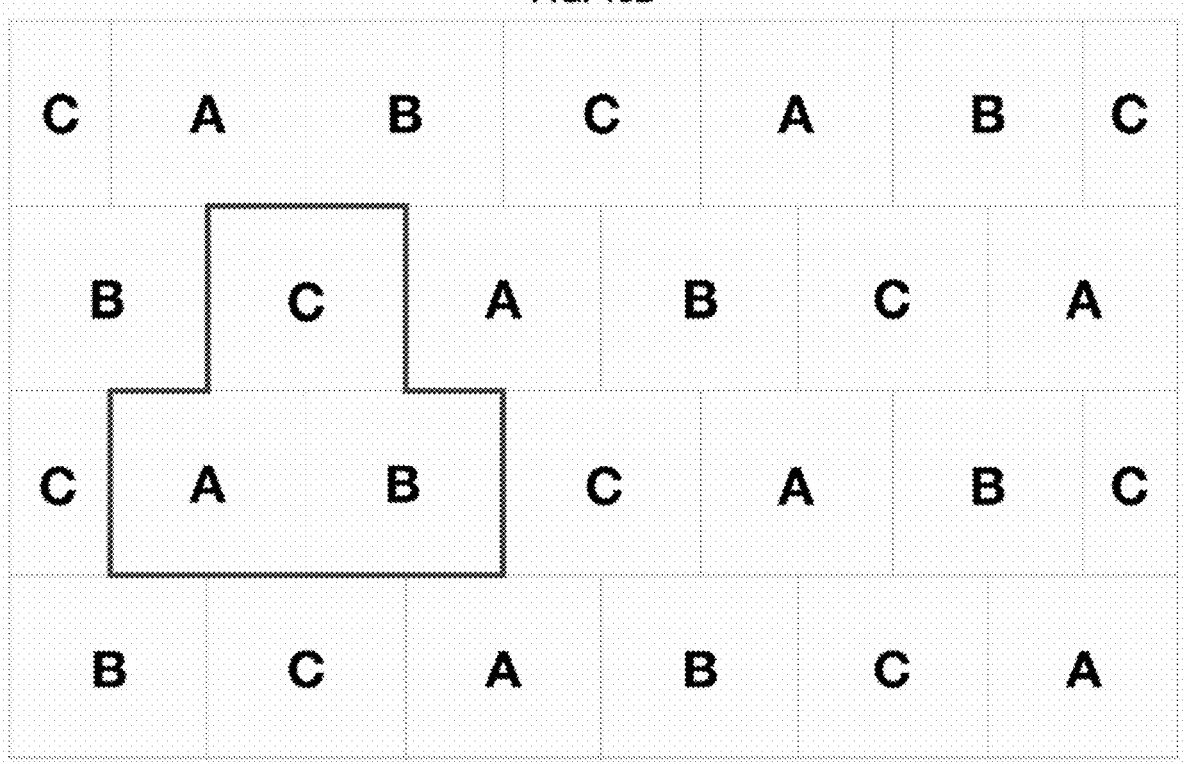
Figure 10E:
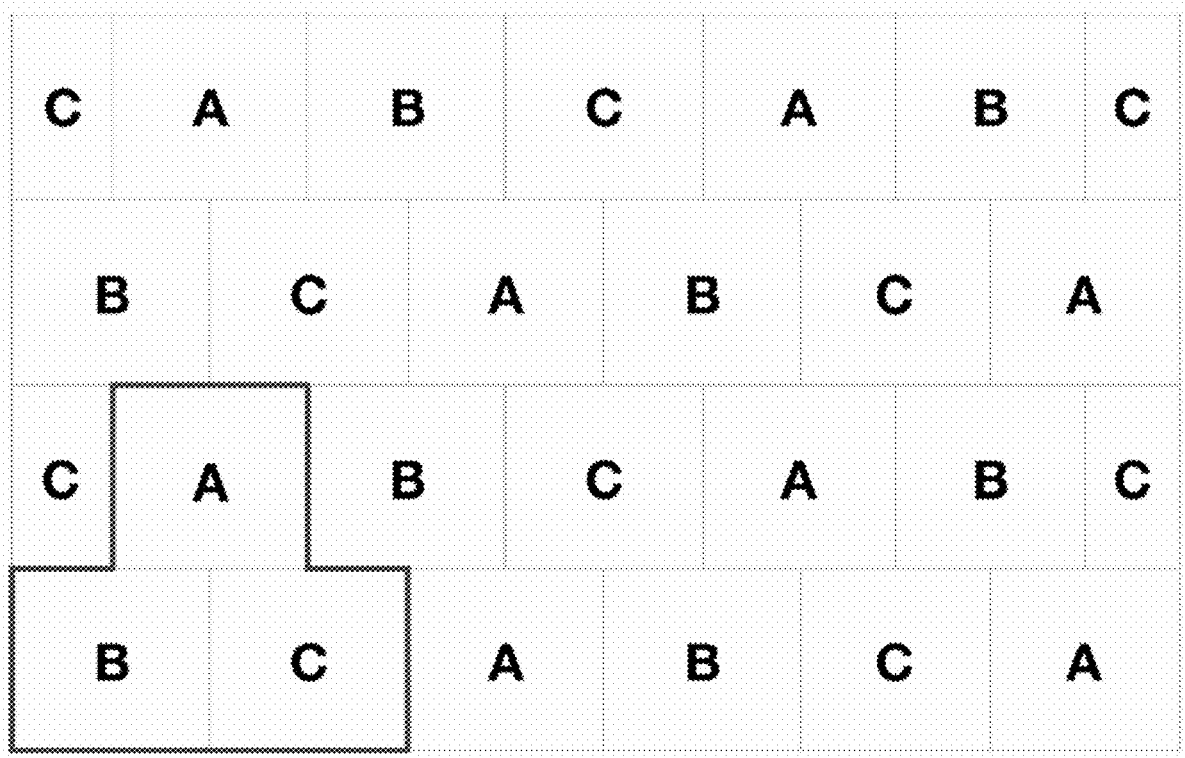
Figure 11A:
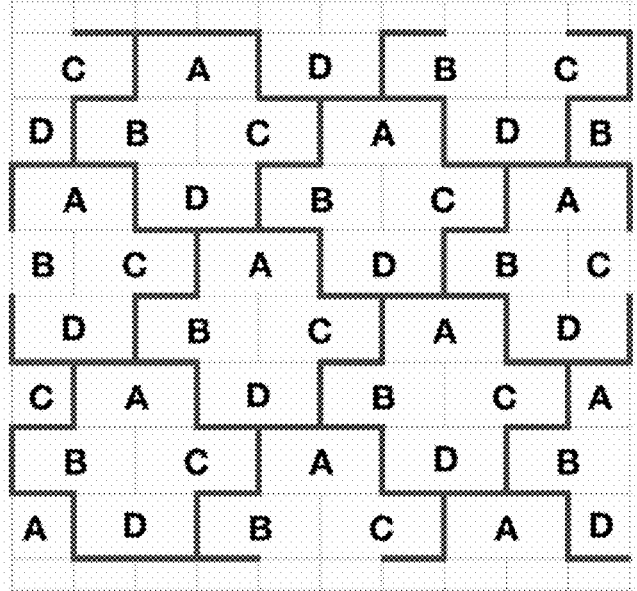
Figure 11B:
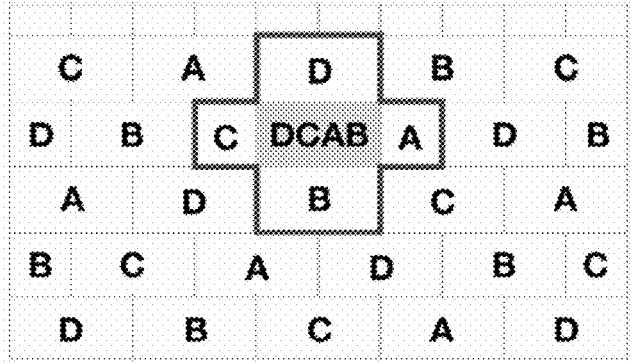
Figure 11C:
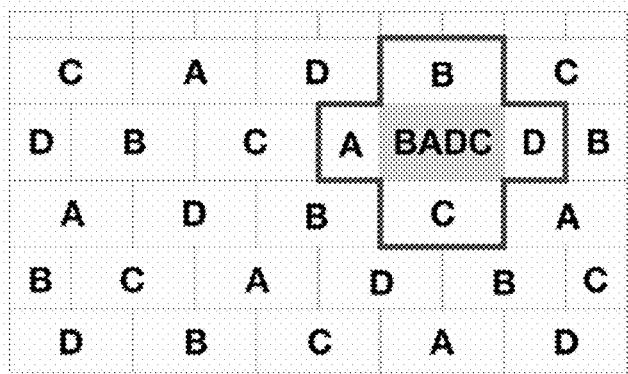
Figure 12A:
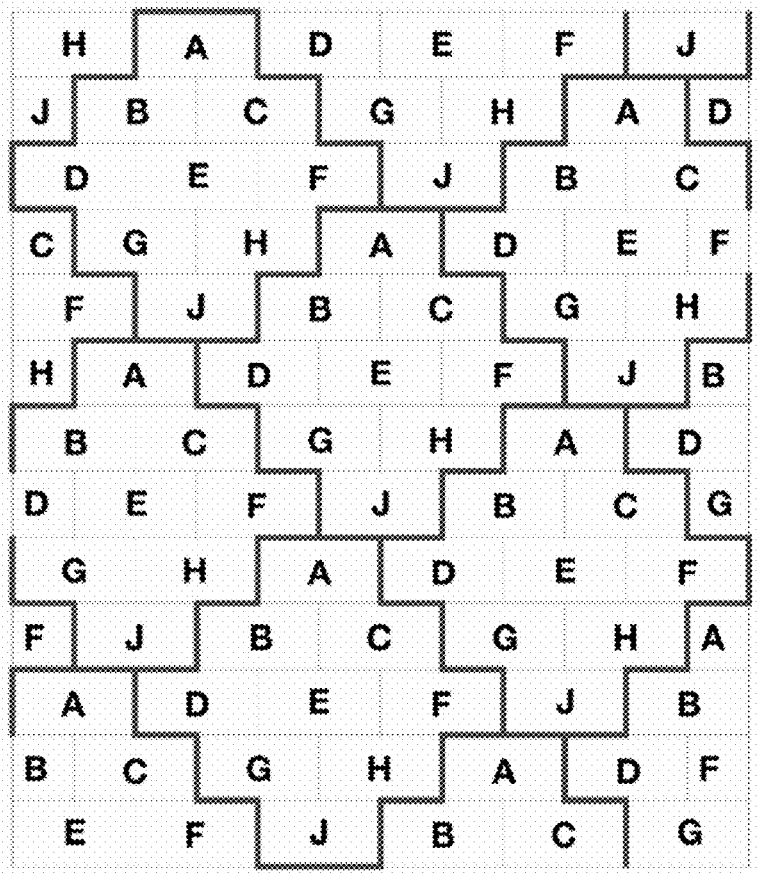
Figure 12B:
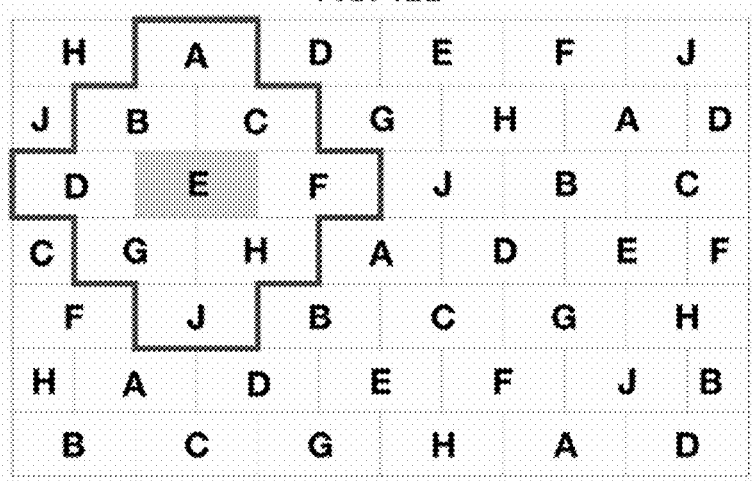
Figure 13A:
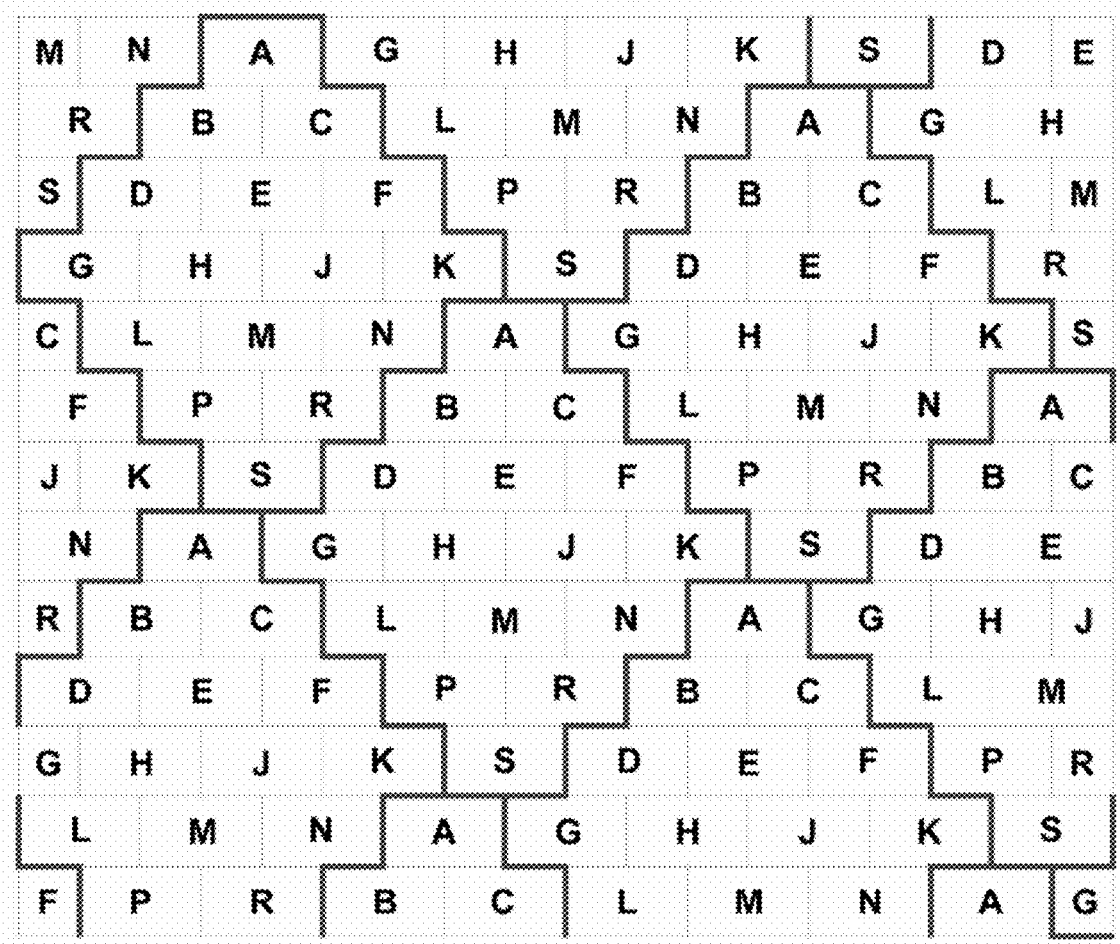
Figure 13B:
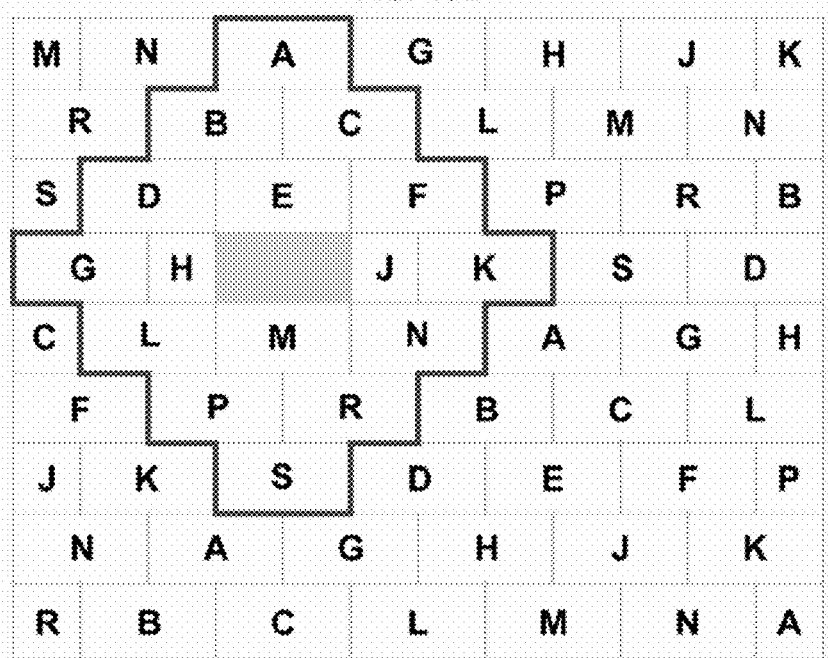
Figure 13C:
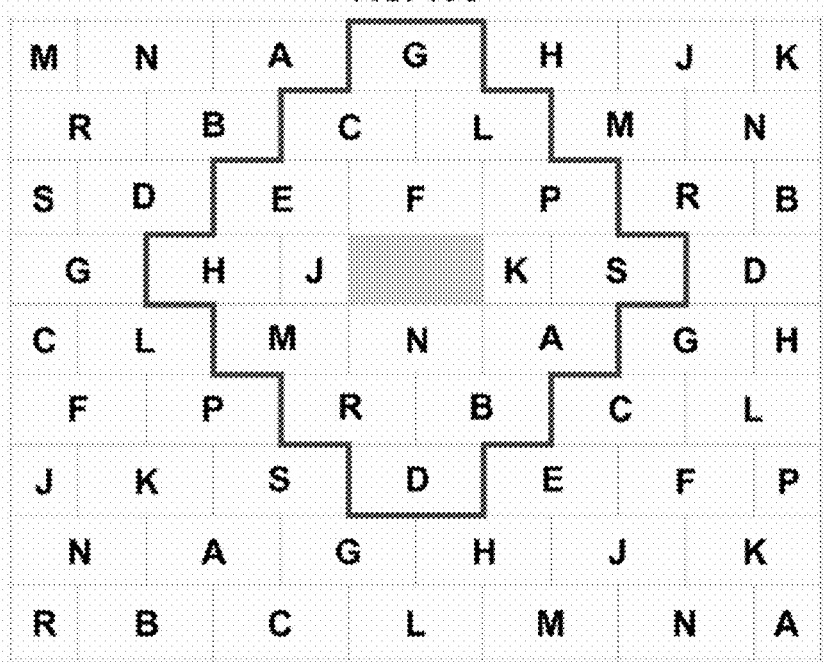

Shown in FIG. 1H is shown a computerized controller 13 for the system 10 herein which is configured to receive output signals from individual light sensors 20 on the CCD 14 and ascertain each of which is overloaded. Such an overload can be determined by ascertaining if the electron count is maximized in the buffer, or using another electronic signal from the light sensors 20.

Where it is determined that a respective light sensor 20 on the grid of the CCD 14 is overloaded, the controller 13 will employ the output signal from one or a plurality of adjacent light sensors 20, which align with filter openings 22 in the secondary filter 12, which have filter media 24 therein reducing light communicated to the adjacent light sensors 20, to calculate a corrected light output signal reading for the determined adjacent overloaded light sensor 20.

In the mode of the system 10 using adjustable filter media 24 such as LCD's positioned in each filter opening 22, the controller will energize and cause the correlating filter media 24 located in a filter opening 22 aligned with an overloaded light sensor 20, to darken and lower the visible light reaching that overloaded light sensor 20. Where photo chromatic film, which is reactive to visible light, is employed as the light filter media 24, the controller 13 may not be necessary since the photo chromatic film located in each respective filter opening 22 will automatically darken to limit and lower the visible light reaching an aligned light sensor 20, to a level below the overload threshold.

FIGS. 2A through 2H, are pictorial representations showing preferred light sensor repeating patterns for practicing the invention in a 5 (1×3×1) cell iteration.

Figures 3A, 3B, 3C, 3D, 3E, 3F:
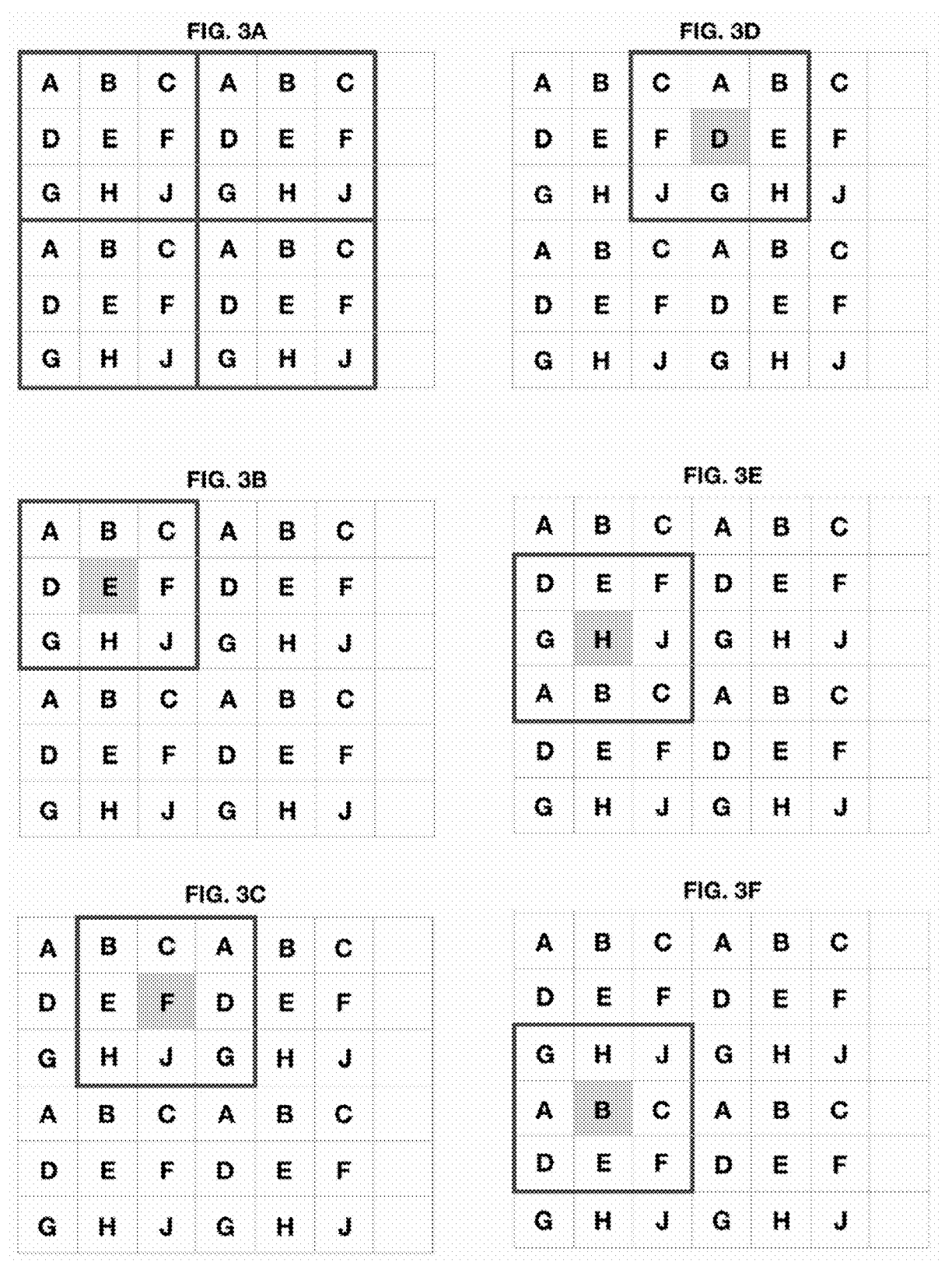

FIGS. 3A through 3N, are pictorial representations showing preferred light sensor positioning patterns for practicing the system herein in a 9 (3×3) cell iteration.

FIGS. 4A through 4K are pictorial representations showing preferred light sensor positioning for employing the system in a 13 (1×3×5×3×1) cell iteration.

FIGS. 5A through 5H are pictorial representations showing preferred light repeating sensor patterns for practicing the system herein in a 25 (1×3×5×7×5×3×1) cell iteration.

FIGS. 6A through 6G are pictorial representations showing preferred light sensor patterns for practicing the invention in a 16 (4×4) cell iteration.

FIGS. 7A through 7E are pictorial representations showing preferred light sensor patterns for employment of the system herein in a 12 (2×4×4×2) cell iteration.

FIGS. 8A through 8G show pictorial representations showing preferred light sensor patterns for employing the system herein in a 24 (3×3×5×5×5×3) modified cell iteration.

FIGS. 9A through 9L are pictorial representations showing preferred light sensor patterns for employment of the system herein in a 3 (1×2 or 2×1) cell iteration.

FIGS. 10A through 10H are pictorial representations showing preferred light sensor patterns for employing the system herein in a 3 (1×2 offset or 2×1 offset) cell iteration.

FIGS. 11A through 11J are pictorial representations showing preferred light sensor patterns for employing the system herein in a 4 (1×2×1) cell with offset iteration, and with a 1.0 width to 0.666 height ratio, for color and non color digital sensors.

FIGS. 12A through 12H are pictorial representations showing preferred light sensor patterns for employment of the system in a 9 (1×2×3×2×1) cell with offset iteration, and with a 1.0 width to 0.6 height ratio.

FIGS. 13A through 13K are pictorial representations showing preferred light sensor patterns for employment of the system herein in a 16 (1×2×3×4×3×2×1) cell with offset iteration, and with a 1.0 width to 0.57 height ratio.

FIGS. 14A through 14K are pictorial representations showing preferred light sensor patterns for employment of the system in a 20 (2×2×4×4×4×2×2) cell iteration, and with a 1.0 width to 0.57 height ratio.

FIG. 15A illustrates a mode of the system adapted to overcome electron overflow where one or a plurality of light sensors maximize their ability to store generated electrons and an overflow to adjacent bins or buffers can occur. As shown, at the top right, and the bottom left, would be positioned normal blocks of nine light sensors similar to the construction of FIG. 3. As shown in FIG. 15A, at the top left and bottom right the filter openings are configured with a work around set of nine filter openings. For each set, the middle column, and the middle row of openings in the filter, are heavily blocked so that only a small percentage of the of photons from incoming light 11 will reach the light sensor 20. The center pixel D6, the greatest blocking pixel, positioned to be protected by the film positioned in the filter openings labeled G3 D3 R3 and B3 but not to be protected from the openings labeled R, B, T, and G. This configuration provides a solution to an overflow in all but the brightest hot spots of incoming light 11 contacting the light sensors 20 in the grid upon the CCD 14.

While all of the fundamental characteristics and features of the disclosed light filtering system and method and modes thereof have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An electronic imaging system, comprising:
a secondary filter having a plurality of filter openings therein, each of said filter openings configured to align with a respective light sensor positioned in a grid of light sensors on a CCD;
light filtering media positioned within a portion of said plurality of filter openings, said light filtering media blocking a percentage of incoming light communicated from a lens through said portion of filter openings to light sensors aligned with said portion of filter openings positioned on said CCD.

2. The electronic imaging system of claim 1, additionally comprising:
said portion of said filter openings having said light filtering media positioned therein being formed in a repeating pattern of filter openings, each said filter opening in said pattern having said light filtering media therein; and
said incoming light communicating through said repeating pattern of filter openings communicating filtered light in said repeating pattern to said light sensors in said repeating pattern, which are positioned on said CCD and aligned with said portion of said filter openings.

3. The electronic imaging system of claim 1, additionally comprising:
a controller, said controller receiving output signals from each of said light sensors positioned on said CCD;
said controller having computer executable instructions running in memory thereon configured to the task of determining if said output signals from any one or plurality of said light sensors positioned on said CCD, are overloaded from an excess of said incoming light communicating with said light sensor;
said controller having executable instructions running in memory thereon, to calculate a corrected output signal for each respective said light sensor determined to be overloaded; and
said controller employing a said output signal from a said light sensor receiving filtered light communicated through said light filtering media which is located adjacent to said light sensor determined to be overloaded, to produce a corrected output signal.

4. The electronic imaging system of claim 2, additionally comprising:
a controller, said controller receiving output signals from each of said light sensors positioned on said CCD;
said controller having computer executable instructions running in memory thereon configured to the task of determining if said output signals from any one or plurality of said light sensors positioned on said CCD, are overloaded from an excess of said incoming light communicating with said light sensor;
said controller having executable instructions running in memory thereon, to calculate a corrected output signal for each respective said light sensor determined to be overloaded; and
said controller employing a said output signal from a said light sensor receiving filtered light communicated through said light filtering media which is located adjacent to said light sensor determined to be overloaded, to produce a corrected output signal.

5. The electronic imaging system of claim 1, additionally comprising:
said portion of said plurality of filter openings having said light filtering media therein being all of said filter openings; and
said light filtering media formed of photo chromatic film located in each respective filter opening, said photo chromatic film being reactive to said incoming light.

6. The electronic imaging system of claim 3, additionally comprising:
said light filtering media formed of liquid crystals;
said controller having executable instructions running in memory thereon to energize said liquid crystals to cause a reduction of the amount of light transmitted through said liquid crystals; and
said controller configured to monitor said output signals from any one or plurality of said light sensors positioned on said CCD which are overloaded from an excess of said incoming light communicating therewith; and
said controller energizing said liquid crystals to thereby reduce said excess of incoming light below a level overloading each of said light sensors which said controller determined as overloaded.

7. The electronic imaging system of claim 1, additionally comprising:

said secondary filter positioned in-between said CCD and a Bayer filter.

8. The electronic imaging system of claim 2, additionally comprising:
said secondary filter positioned in-between said CCD and a Bayer filter.

9. The electronic imaging system of claim 1, additionally comprising:
said secondary filter positioned in-between said Bayer filter and a lens communicating said incoming light to said CCD.

10. The electronic imaging system of claim 2, additionally comprising:
said secondary filter positioned in-between said Bayer filter and a lens communicating said incoming light to said CCD.

11. The electronic imaging system of claim 1, additionally comprising:
said light filtering media being a solid material blocking all said incoming light from passage therethrough;
one or a plurality of openings communicating through said solid material for communicating said incoming light therethrough to said CCD.

12. The electronic imaging system of claim 2, additionally comprising:
said light filtering media being a solid material blocking all said incoming light from passage therethrough;
one or a plurality of openings communicating through said solid material for communicating said incoming light therethrough to said CCD.

13. The electronic imaging system of claim 1, additionally comprising:
said percentage of incoming light blocked by said filtering media being in a range between 75% to 99.999% of the total amount of said incoming light.

14. The electronic imaging system of claim 2, additionally comprising:
said percentage of incoming light blocked by said filtering media being in a range between 75% to 99.999% of the total amount of said incoming light.

15. The electronic imaging system of claim 7, additionally comprising:
said percentage of incoming light blocked by said filtering media being in a range between 75% to 99.999% of the total amount of said incoming light.

16. The electronic imaging system of claim 8, additionally comprising:
said percentage of incoming light blocked by said filtering media being in a range between 75% to 99.999% of the total amount of said incoming light.

17. The electronic imaging system of claim 9, additionally comprising:
said percentage of incoming light blocked by said filtering media being in a range between 75% to 99.999% of the total amount of said incoming light.

18. The electronic imaging system of claim 10, additionally comprising:
said percentage of incoming light blocked by said filtering media being in a range between 75% to 99.999% of the total amount of said incoming light.

* * * * *